United States Patent
Gold et al.

(10) Patent No.: US 10,318,811 B1
(45) Date of Patent: Jun. 11, 2019

(54) METHODS AND SYSTEMS FOR DETECTING OBJECTS BY NON-VISIBLE RADIO FREQUENCIES AND DISPLAYING ASSOCIATED AUGMENTED REALITY EFFECTS

(71) Applicant: BUBBLER INTERNATIONAL LLC, Jackson Heights, NY (US)

(72) Inventors: Robert J. Gold, Jackson Heights, NY (US); Joan Bueno, Barcelona (ES)

(73) Assignee: BUBBLER INTERNATIONAL LLC, Chandler, AZ (US)

( * ) Notice: Subject to any disclaimer, the term of this patent is extended or adjusted under 35 U.S.C. 154(b) by 0 days.

(21) Appl. No.: 16/199,179

(22) Filed: Nov. 25, 2018

Related U.S. Application Data

(60) Provisional application No. 62/661,015, filed on Apr. 22, 2018.

(51) Int. Cl.
| | |
|---|---|
| *G09G 5/00* | (2006.01) |
| *G06K 9/00* | (2006.01) |
| *H04W 4/80* | (2018.01) |
| *H04W 4/021* | (2018.01) |
| *G06T 19/00* | (2011.01) |

(52) U.S. Cl.
CPC ........ *G06K 9/00671* (2013.01); *G06T 19/006* (2013.01); *H04W 4/021* (2013.01); *H04W 4/80* (2018.02)

(58) Field of Classification Search
CPC .... G06K 9/00671; H04W 4/80; H04W 4/021; G06T 19/006
USPC ......................................... 345/619, 631, 632
See application file for complete search history.

(56) References Cited

U.S. PATENT DOCUMENTS

| | | | |
|---|---|---|---|
| 8,433,722 B2 | 4/2013 | Shin et al. | |
| 8,750,894 B1 * | 6/2014 | Stogaitis | H04W 4/02 370/325 |
| 8,814,691 B2 | 9/2014 | Haddick et al. | |

(Continued)

FOREIGN PATENT DOCUMENTS

| | | |
|---|---|---|
| KR | 20110136018 A | 12/2011 |
| KR | 20140029670 A | 3/2014 |
| WO | 2017149520 A1 | 9/2017 |

*Primary Examiner* — Sarah Lhymn
(74) *Attorney, Agent, or Firm* — Venjuris PC

(57) ABSTRACT

Methods and systems for detecting and identifying one or more objects in the vicinity using radio frequency signals, excluding visible spectrum frequencies, (the "non-visible RF signals") and displaying an AR image with an AR element associated with each of the one or more identified objects are disclosed. An exemplary method includes the steps of: detecting and registering one or more objects in the vicinity of a mobile device by non-visible RF signals; tracking the registered objects; rendering the AR elements associated with the registered objects; and displaying an AR image with the AR elements anchored to the associated objects in the visual scan area of the mobile device. This embodiment may further include a step of rendering a special kind of AR elements, called LARI AR elements, that includes a boundary and a cut-out area, and the associated AR effect rendered is limited to the area in the boundary but excluding the cut-out area. As such, in this embodiment, the object with a LARI AR element would appear entirely or partially framed by the AR element in the AR image.

48 Claims, 24 Drawing Sheets

(56) References Cited

U.S. PATENT DOCUMENTS

| | | |
|---|---|---|
| 8,941,560 B2 | 1/2015 | Wong et al. |
| 9,087,403 B2 | 7/2015 | Keating et al. |
| 9,092,898 B1 | 7/2015 | Fraccoroli et al. |
| 9,240,059 B2 | 1/2016 | Zises |
| 9,342,610 B2 | 5/2016 | Liu et al. |
| 9,480,913 B2 | 11/2016 | Briggs |
| 9,489,772 B2 | 11/2016 | Raffa et al. |
| 9,530,059 B2 | 12/2016 | Zises |
| 9,613,448 B1 * | 4/2017 | Margolin ................. G06T 11/60 |
| 9,678,654 B2 | 6/2017 | Wong et al. |
| 2014/0055488 A1 | 2/2014 | Masters |
| 2014/0085483 A1 * | 3/2014 | Leung .................... H04N 5/225 348/169 |
| 2014/0225922 A1 * | 8/2014 | Sbardella .............. G06T 19/006 345/633 |
| 2015/0221133 A1 * | 8/2015 | Groten ............... G06K 9/00671 345/633 |
| 2015/0319342 A1 * | 11/2015 | Schowengerdt ........ G06T 13/40 348/47 |
| 2016/0005233 A1 | 1/2016 | Fraccaroli et al. |
| 2016/0171767 A1 | 6/2016 | Anderson |
| 2016/0335917 A1 * | 11/2016 | Lydecker ............. G09B 21/008 |
| 2017/0091975 A1 | 3/2017 | Zises |
| 2018/0173404 A1 * | 6/2018 | Smith ................. G06F 3/04842 |

* cited by examiner

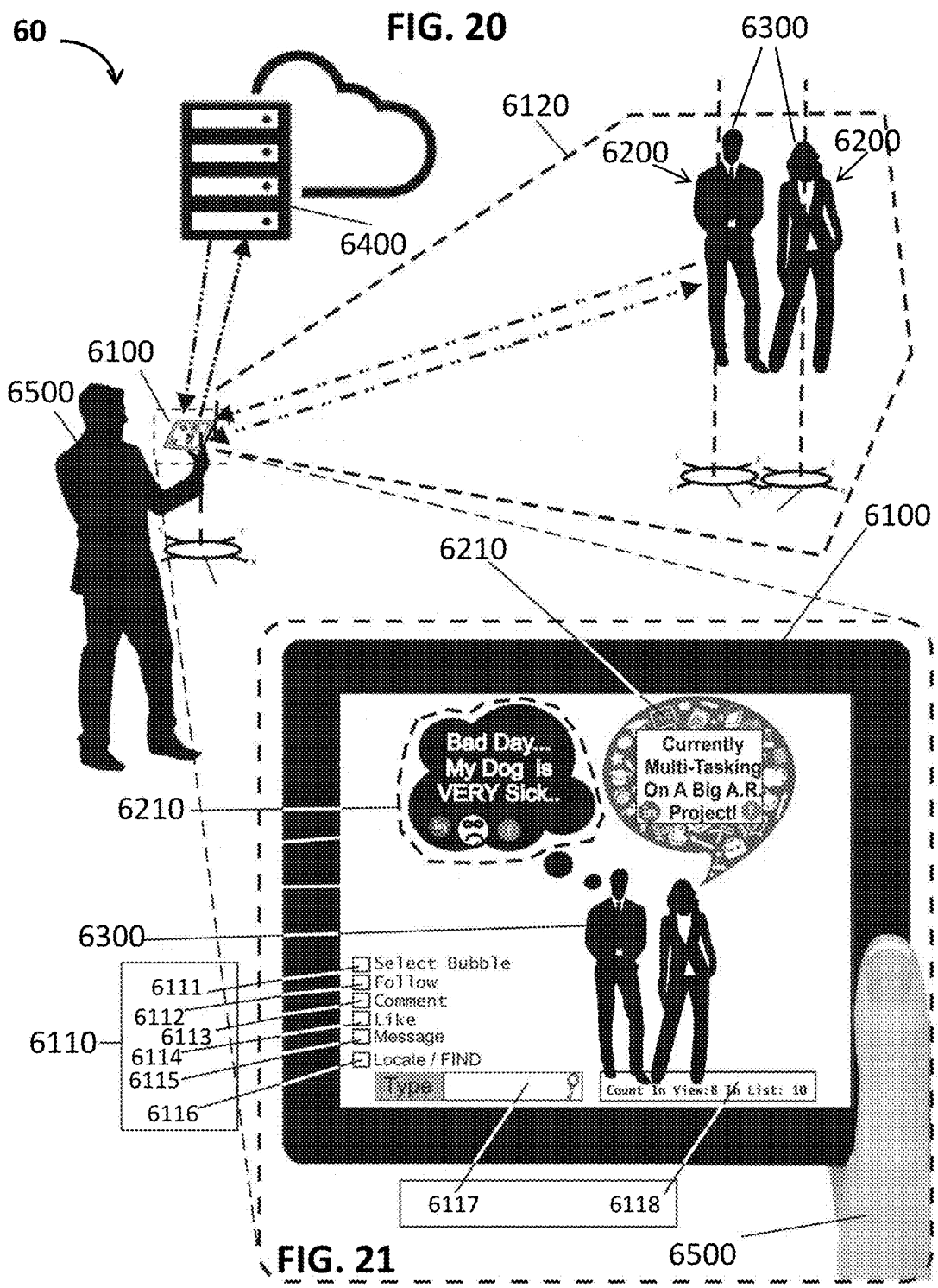

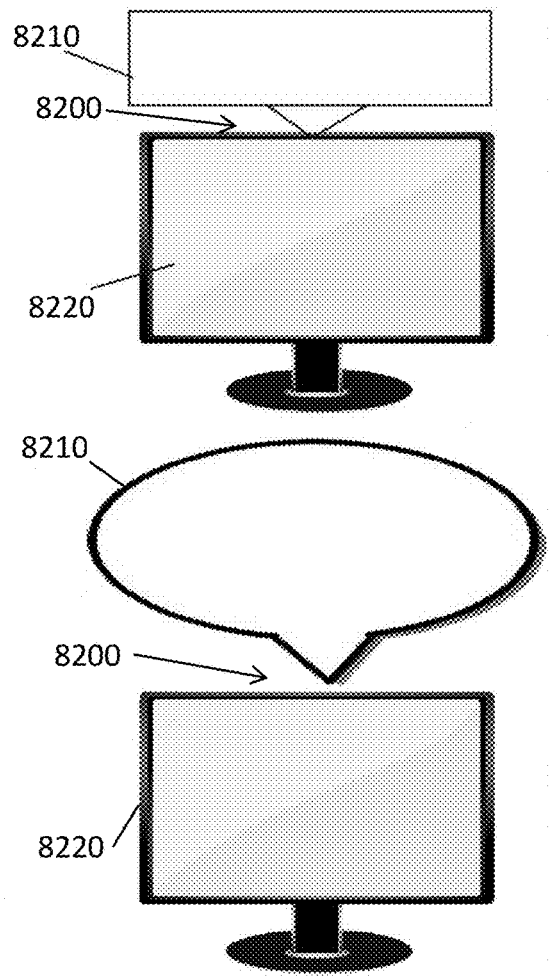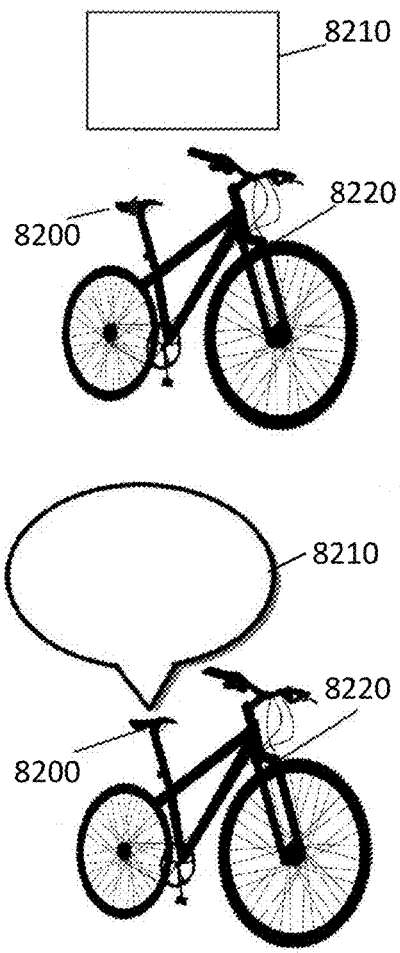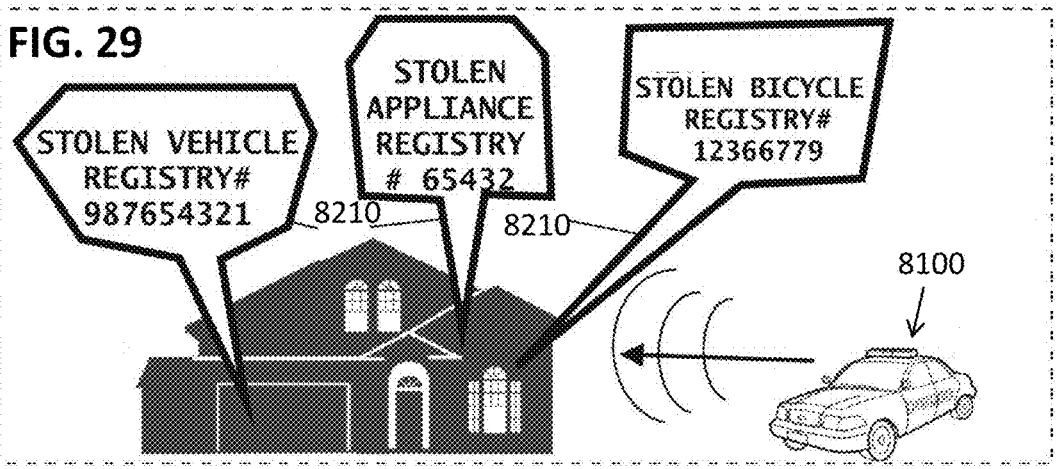

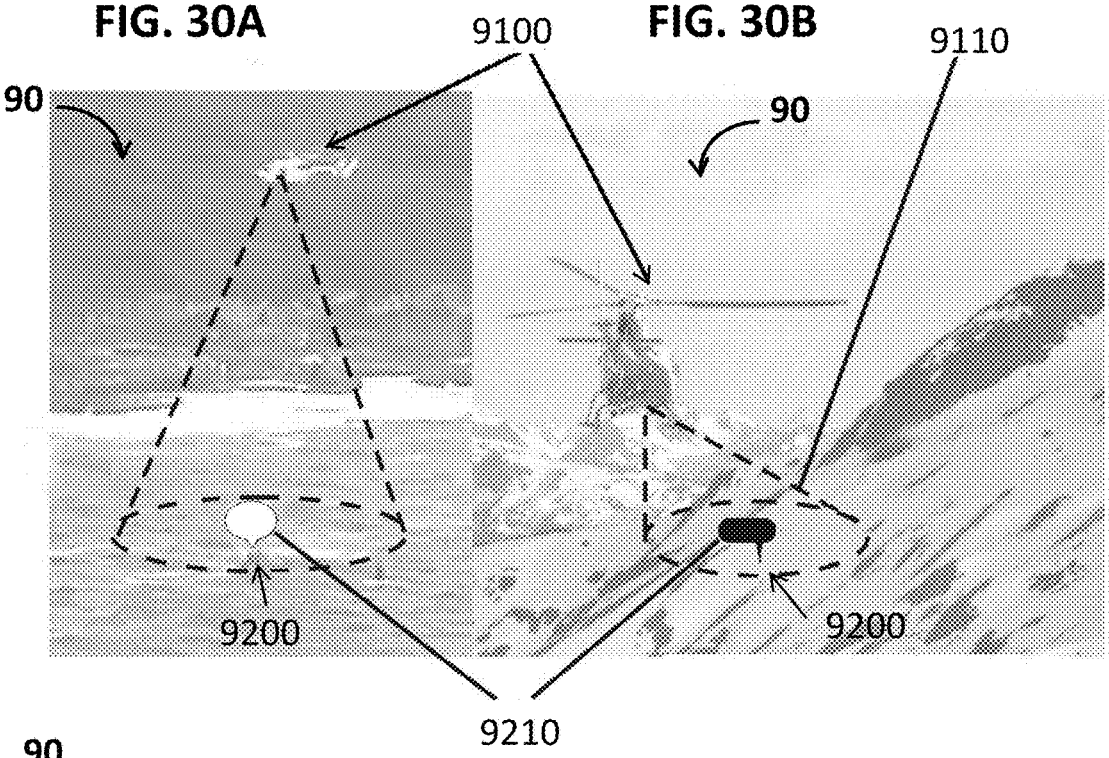
FIG. 30A FIG. 30B
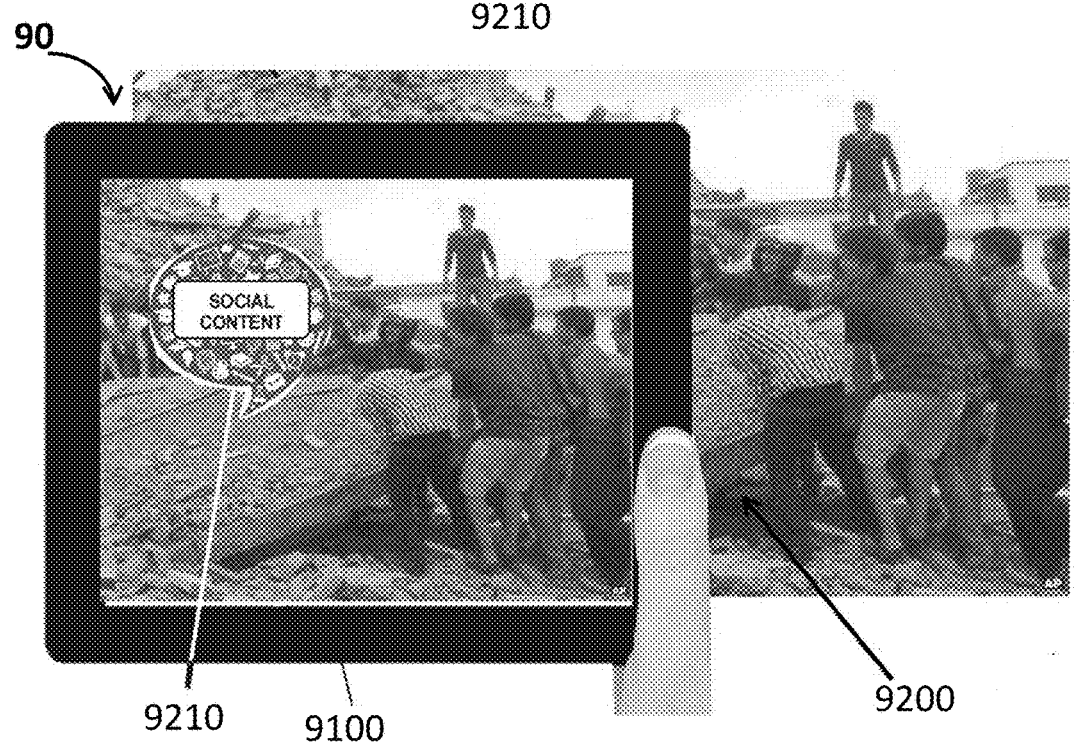
FIG. 30C

METHODS AND SYSTEMS FOR DETECTING OBJECTS BY NON-VISIBLE RADIO FREQUENCIES AND DISPLAYING ASSOCIATED AUGMENTED REALITY EFFECTS

CROSS-REFERENCE TO RELATED APPLICATIONS

The present application claims priority to the United States provisional patent application, entitled "RF Activated and Anchored AR Display System (RFARDS)," having Ser. No. 62/661,015, filed on Apr. 22, 2018, which is entirely incorporated herein by reference.

BACKGROUND

Existing Augmented Reality ("AR") imaging systems are limited in their abilities to recognize objects or render AR elements associated with the objects at precise locations when the objects are not fully captured by a camera. Many of the existing systems recognize objects by analyzing the image of the object. In such system, when the object is blocked from view or when some key features of the object are lacking in the object's image, the system cannot recognize it, let alone rendering the desired AR element(s) of the object at a designated location. As such, such systems cannot be used to render AR elements of some remote objects, such as a stage in a concert where the audience in the far back don't always have a clear view of the entire stage.

Furthermore, for AR elements that are displayed as a frame or a background of an object, existing AR systems are limited in rendering such AR elements based on the predetermined shapes and dimensions of the AR elements or the edge(s) of the object. Frame-like AR elements of fixed shapes and dimensions are boring since they are merely superimposed on the image of the object. Even if the system can detect the edge(s) of the object, such determination is generally based on image processing techniques. Again, once the object is not fully captured by the camera, the edges) of the object cannot be determined, and the AR system would not be able to properly render this kind of AR element(s).

Therefore, it is desired to have a method or system configured to identify one or more objects even when some of the objects are entirely or partially hidden from view.

It is also desired to have a method or system configured to render an AR element with a cut-out/see-through area that is determined based on the characteristics of an object, rather than the properties of the AR element.

SUMMARY

The structure, overall operation and technical characteristics of the present invention will become apparent with the detailed description of preferred embodiments and the illustration of the related drawings as follow.

The invention is incorporated in methods for detecting and identifying one or more objects in the vicinity using radio frequency signals, excluding visible spectrum frequencies, (the "non-visible RF signals") and displaying an AR image with an AR element associated with each of the one or more identified objects, and systems implementing such methods.

Methods for Detecting Objects and Displaying the Objects with their Associated AR Effects A preferred embodiment is a method comprising steps of:
Step 1: detecting and registering one or more objects located within a vicinity of a mobile device, using one or more transceivers of the mobile device configured to communicate with the objects by non-visible RF signals.

Step 2: tracking a relative location of each of the registered objects located within a vicinity of the mobile device, relative to the mobile device.

Step 3: generating in real time an AR element of each of the objects with an AR type as Large-AR-Image (LARI) and located inside a visual scan area by:
  Step 3.1: determining a boundary of the AR element, the boundary configured to surround a real-world image of the object.
  Step 3.2: determining a cut-out/see-through area within the boundary, the cut-out area configured to show a predetermined portion of the real-world image of the object.
  Step 3.3: rendering an AR effect within the boundary, excluding the cut-out area, the AR effect scaled and oriented based on the relative location and an orientation of the object.

Step 4: generating in real time the AR element of each of the objects with the non-LARI AR type and located inside the visual scan area.

Step 5: displaying the AR image rendered with the AR element anchored to each of the objects located inside the visual scan area.

This preferred embodiment is configured to identify objects nearby, by one or more transceivers of the mobile device communicating with the objects by non-visible RF signals (Step 1). Various technologies may be adopted for communicating with, and identifying, the objects, including Bluetooth, Radio-frequency identification (RFID), RF transmissions, Near field communication (NFC), Mobile Wireless Sensor Networks (MWSNs), Wireless Sensor Networks (WSNs), Mobile ad hoc networks (MANETs), cloud relay systems, peer-to-peer ad hoc messaging networking mode, analog and digital beacons, GPS, and any suitable wireless communication protocols known to the art.

Since this embodiment uses non-visible RF signals, it can detect all objects capable of communicating by non-visible RF signals nearby, including objects hidden from view. If an object is identified, this embodiment registers the object, locally at the mobile device or remotely at a server (Step 1) and continuously tracks where the object is, relative to the mobile device (Step 2). Alternatively, the preferred embodiment may be configured to register only the detected objects in the visual scan area in Step 1 to save memory.

The embodiment may be configured to determine the relative location of an object (Step 2) by any suitable methods, such as trilateration, triangulation, or calculating by the known locations of the object and the mobile device in a specific reference system, obtained from GPS satellites or any locating server, such as a real-time locating system or a beacon tracking system. Trilateration or triangulation can be used in an embodiment to determine the location of an object ($Object_1$) by reference to other objects with known locations (the "reference objects"). An exemplary embodiment may determine the distance between the mobile device and $Object_1$ (Distances) by measuring the response time of $Object_1$ in any corresponding communications—beginning from the time the mobile device transmitting any inquiry in a non-visible RF signal to $Object_1$ and ending at the time the mobile device receives a reply in the non-visible RF signal from $Object_1$ (assuming that the time for processing the inquiry and the reply can be ignored). In fact, such communications are directional. Through the communications between the mobile device and Object$_1$, the embodiment may determine from which direction the reply of Object$_1$ comes from.

Similarly, with the coordinates of the reference objects known and the distances between the mobile device and the reference objects and the directions of the replies from the reference objects determined by the aforementioned way, the embodiment may be configured to determine the location of Object$_1$ by the distances and the angles between the directions that the respective replies by Object$_1$ and the reference objects come from. The formula of trilateration and triangulation are well known in the art. A simplified 2-dimensional example is illustrated below:

In an embodiment, the mobile device's coordinate is (0, 0) in a Cartesian coordinate system and the coordinate of a reference object Object$_r$ is (X$_r$, Y$_r$). When the distance between the mobile device and Object$_1$ is D$_1$, and the angels between the responses from Object$_1$ and Object$_r$ is $\Theta$, the coordinate of Object$_1$ (X$_1$, Y$_1$) can be determined as below:

$$X_1 = D_1 * \cos\left(\Theta + \tan^{-1}\frac{Yr}{Xr}\right);$$

and $$Y_1 = D_1 * \sin\left(\Theta + \tan^{-1}\frac{Yr}{Xr}\right).$$

Since non-visible RF signals are often reflected, refracted, diffracted, and/or scattered, the distances and the directions the reply signals are from may not be always correct. It is thus preferred that an embodiment is configured to use more reference objects and/or adopt more than one locating methods, such as trilateration and triangulation together, to get a more accurate result.

Furthermore, this preferred embodiment only renders the AR elements, associated with the objects, detected and registered in Step 1, that are located inside the visual scan area, into the AR image, in Steps 3-5. In an alternate embodiment, depending on the usage and settings, the embodiment may be configured to also render the AR elements of the objects located outside, but near the borders of, the visual scan area or display an indication, such as an arrow or a star, to show that there are other detected objects outside of the visual scan area.

The visual scan area here refers to not only an area captured by the camera and shown in the display of the mobile device but may also include an area that is in the same general direction but not captured by the camera, yet within the detectable range of the non-visible RF signals. That is, since the objects are detected by non-visible RF signals, this embodiment can spot the objects located in the visual scan area, even those hidden from view, such as being hidden partially or entirely by other objects or building, limited only by the range of the non-visible RF signals.

For every registered object located inside a visual scan area, this preferred embodiment uses an attribute, called AR type, to determine what kind of AR element to associate with the object—being LARI or not LARI (non-LARI) in Steps 3-4. When the AR type of the AR element associated with an object is LARI, in this embodiment, the object's AR element is an AR effect surrounding the object like a frame, when displayed on the display of the mobile, within a boundary, but outside the cut-out area where the object's image is shown, entirely or partially, on the display (Step 3).

The AR type and the AR effect of an object in an embodiment are preferably configurable by a user via a user interface. In an embodiment where an object can be associated with multiple AR elements, the AR elements associated with the same object may have different AR types (some LARI and others non-LARI), while in another embodiment with an object associated with multiple AR elements, all the AR elements associated with the object may be required to have the same AR type—either LARI or non-LARI, but not both. Also, an embodiment may be configured to render either LARI-type AR element or non-LARI-type AR element only (i.e. Step 3 or 4 may be omitted).

In an exemplary embodiment where Step 3 is adopted, at least one of Steps 3.1 and 3.2 is preferred to use one or more transmission broadcast units ("TBUs") to provide at least one reference points of the boundary or cut-out area by communicating with the mobile device via non-visible RF signals. For instance, an object associated with a LARI-type AR element in an embodiment may be surrounded by multiple TBUs configured to define a virtual periphery of the object that corresponds to the cut-out area of the AR element on the AR image. In this embodiment, the mobile device is configured to determine the cut-out area of the AR element by finding the responsive locations of the TBUs in the AR image and connecting the dots by any known methods, such as drawing a straight line or a curve line between each pair of adjacent dots.

In an alternate embodiment, the cut-out area of an LARI AR element may be determined based on: (1) a predetermined shape of the cut-out area; (2) known locations of multiple TBUs relative to the object's virtual periphery (i.e. the "role" of each TBU); (4) the distances between the mobile device and each TBU; and (4) the coordinates of the TBUs in a reference coordinate system. For instance, the AR element of a LARI-type object in an embodiment may be known to have a rectangular cut-out area, i.e. a rectangular periphery, and three TBUs, say TBU$_1$, TBU$_2$, and TBU$_3$, respectively located at the top left, bottom left, and the bottom right corners of the virtual periphery. That is, the "role" of TBU$_1$ is the indicator of the top left corner, the "role" of TBU$_2$ is the indicator of the bottom left corner, and so on. With the roles and coordinates of TBU$_1$, TBU$_2$, and TBU$_3$ known, the distances between each pair of the TBUs and the entire virtual periphery can be determined. In addition, with the distances between the mobile device and each of the 3 TBUs determined as discussed above, the embodiment may in turn determine the locations/coordinates of the mobile device by trilateration and/or triangulation. As the virtual periphery of the LARI-type object is known, the embodiment may determine the cut-out area of the AR element. In addition, with the cut-out area now known, the embodiment may also determine the relative orientation of the object based on the relative orientation of the cut-out area if they are known to be the same.

This embodiment may also be configured to construct the cut-out area of another LARI-type AR element if the cut-out area/periphery is known to be a circle, and at least three TBUs on the periphery, i.e. circumference, or two TBUs on the circumference and one TBU at the center of the circle periphery. Similarly, as long as the equation of the virtual periphery of an LARI-type AR element and enough TBUs with known coordinates and roles are provided, this embodiment can be configured to determine the coordinate of the mobile device, i.e. the relative locations of the TBUs, and consequently the virtual periphery and the cut-out area.

Furthermore, an embodiment may be configured to determine the boundary of an LARI AR element based on: (1) a predetermined shape of the boundary; (2) known roles of multiple TBUs for the boundary; (3) a distance between the mobile device and each TBUs; and (4) the coordinates of the TBUs, just like the way a cut-out area can be determined as stated above. Alternatively, an embodiment may be configured to determine the boundary of an LARI AR element based on a predetermined equation(s) of the boundary in reference to the multiple TBUs for the cut-out area. For instance, if a LARI-type AR element has a square cut-out area known or determined in a method stated above, and the corresponding boundary are known to have edges parallel to those of the cut-out area with a predetermined distance between each pair of corresponding edges of the boundary and the cut-out area, the embodiment would be able to determine the boundary of the AR element on the AR image.

In addition, in Step 3, the AR effect is preferably scaled and oriented according to the relative location and the orientation of the object. That is, depending on the attributes of the registered object (or its associated AR element(s)) or the settings of the embodiment, the LARI AR element of the object may become larger or smaller when the object moves closer or farther from the mobile device, preferably in proportion to the change in the size of the object's image in the display. (Note that the movements of the object discussed here are relative to the mobile device. Any relative movements might be caused by the mobile device, the object, or both.)

Furthermore, the LARI-type AR element of the object in this embodiment may rotate in a predetermined way when the object rotates. For instance, for an AR element whose AR type is LARI and the AR effect is an animation of flames or bubbles, the AR element in this embodiment may include flames or bubbles surrounding the associated object in its boundary, excluding the cut-out area. When the associated object rotates, the boundary and cut-out area of its AR element in this embodiment may be configured to rotate with the object. But based on the settings of the embodiment, the animated flames or bubbles of the AR element in this embodiment may have their own pattern in response to the detected rotation of the object, such as rotating only horizontally but not vertically (i.e., flames/bubbles always going up) to be more realistic.

As to the objects associated with AR elements with non-LARI AR type, as in Step 4, the object's AR element in this embodiment may be in the form of an icon, a text, an image, a video clip, a URL, or a thought bubble, placed at a location in the AR image based on the attribute(s) of the object and/or the settings of the embodiment. The non-LARI AR element in this embodiment may include various information associated with the object, such as a current status, a commercial, a social media profile picture, a link to a social media profile, a product information of the associated object, a product endorsed by the associated object (a person), a sponsor information, and so forth, determined based on the attributes of the objects and/or the settings of the embodiment.

For instance, an embodiment used in a trade show may display the role (an attribute) of each registered attendee, in the form of an icon along with a link to the attendee's profile (another attribute). The role in this example may include a buyer, a seller, and staff of the trade show. The role, the link, and/or the profile of every attendee in this exemplary embodiment may be stored in each attendee's badge with an RFID in it or at a remote database accessible by the mobile device based on a unique ID of the attendee stored in the RFID on the badge. If a user of the mobile device in this exemplary embodiment wants to find certain buyers nearby, he/she can click at the icon of a buyer and the link would bring up a second AR element or a pop-up window, showing the buyer's profile. Alternatively, the attendee's profile may be retrieved from a remote site, such as the attendee's company website, and the link may be configured to trigger the embodiment to bring up a browser to show this information.

Moreover, the AR elements of the objects in the visual scan area are preferably anchored to the objects in the AR image in this embodiment in Step 5. The AR image in this embodiment is an image captured in real time by the camera, with the AR elements superimposed on the image near or partially overlapping the associated objects. As stated above, the LARI AR element of an object of this embodiment is always surrounding the object like a frame, even when the relative location of the object changes. The non-LARI AR elements in this embodiment are also preferably configured to move with the associated objects. For instance, in an embodiment, when a registered object in the visual scan area is a cell phone in a person's pocket, and the associated AR element is a thought bubble showing the person's status, such as the person's latest Tweet on Twitter™ or an emoji of that person choice, the AR element preferably is shown above the person's head in the AR image and moves with the person if the person is walking away or moving in a vehicle.

Additionally, various alterations in implementations and/or omissions of the steps above can be adopted. An embodiment is preferably configured to detect and register multiple objects (Step 1) in batches. Such an exemplary embodiment may be configured to:
1. simultaneously scan a batch of the objects located within the vicinity of the mobile device, by the one or more transceivers:
   a. broadcasting a single request of a unique identification (ID) by non-visible RF signals; and
   b. receiving an ID of each of the objects by the non-visible RF signals,
2. if the ID of an object is not registered in the storage component of the mobile device (such as an internal memory, a NAND flash memory, a micro SD card, or a cloud drive), include the object as a member object of the batch until reaching a predetermined size of the batch, and
3. after the batch of unregistered objects are identified, register each member object of the batch by saving the ID and the relative location of the member object to the storage component (the relative location determined by any of the methods stated above).

For instance, an embodiment in which the mobile device and the objects communicate with Bluetooth signals may detect the objects by: the mobile device sending out an inquiry request to try to discover the objects, and the objects listening to such inquiry and responding with their addresses, i.e. unique IDs (and optionally, names, types of the objects, and other information). While the embodiment is scanning the objects, it also measures the response time of each responding object. In this exemplary embodiment, the size of a batch is 5, and the embodiment is configured to group the first 5 unregistered objects as a batch and save the ID and the relative location of each of the member object to the storage component of the mobile device. In this embodiment, the relative locations of the objects are determined based on the respective response time and directions of the responding signals, preferably by trilateration and triangulation as illustrated above. This embodiment may additionally register other information of the objects when the connections between the mobile device and the objects are formed at this step.

Furthermore, for an embodiment configured to track the relative locations of all registered objects, as in Step 2 above, if the relative location of a registered object has been outside the visual scan area for at least a predetermined period of time, such as 2 seconds or 3 minutes, the embodiment may be configured to remove this object from the storage component and stop tracking it to save resources. In such embodiment, if the object reappears in the visual scan area, the embodiment is simply configured to treat it like a newly detected object.

Moreover, an embodiment may allow the user of the mobile device to discriminate among, or filter out, some detected objects. That is, if the user only wants to see objects with certain attributes, such as buyers in a trade show, single males between the age of 25 to 35, or the user's friends on a social media platform, the embodiment may provide a user interface for the user to choose or enter the one or more criteria (i.e., "discriminators"), and only generate the AR element of each of the objects that meet the one or more criteria. Based on the various implementations of the embodiment, the one or more attributes of an object may be stored locally at the object, such as an RFID's or a cell phone's memory chips, or remotely, such as the object's associated profile at the social media server(s). For information stored locally at the objects, the embodiment is configured to retrieve the attributes directly from the objects via non-visible RF signals.

Similarly, the objects in an embodiment may discriminate among mobile devices too. In an embodiment, the one or more objects may be configured to always provide the attributes requested by the mobile device, while in another embodiment, the objects may be configured to respond to such requests only if the mobile device also meets certain requirements. For instance, in an embodiment in a hospital, the objects, such as the RFIDs every patient carries, may be configured to always respond to the hospital security's mobile device's requests. But in an embodiment for social networking, the objects, such as cell phones of Facebook™ users, may allow the users of the objects to block requests from the mobile devices of those users that they are not friends with or stop responding to any requests at a certain time, such as in a meeting or after 10 pm every day.

Additionally, an embodiment may further comprise the step of: authenticating a user privilege; and if authenticated, only registering, tracking, and rendering AR elements (Steps 1-5) associated with the objects whose IDs are recorded in a database. Such an embodiment may be used for recovering lost assets (objects) by the law enforcement or insurance investigators when they patrol on the street with their mobile devices. In this embodiment, each object includes a locator, such as a RFID or any commercially available tracker, attached when the object is manufactured or when the owner subscribes to a loss recovery service. It is preferred that only the mobile devices used by an authenticated user, such as law enforcement officer or an insurance investigator, can activate this embodiment. Once the user is authenticated, preferably by a remote server running the loss recovery service, the embodiment is configured to detect objects in the vicinity of the mobile device, using non-visible RF signals, and then match the ID of every object detected with the IDs of the lost objects reported and stored at either a remote database or a local memory.

When one or more lost objects are detected, the embodiment is configured to register, track, and render AR elements associated with these lost objects, such as thought bubbles showing the ID and a description of each registered lost object, an icon showing the type of the registered lost object, and/or an arrow pointing to that object. In this embodiment, when a lost object, not located in the visual scan area, is detected, it is preferred that this object is still registered and tracked, with an AR element showing an arrow pointing to an edge of the AR image closer to object. This embodiment may be configured to provide a user interface for recording the lost objects in the database by the law enforcement or the owners who subscribe to the loss recovery service, for free or with a subscription fee. Additionally, this embodiment may be further configured to save the locations of the detected lost objects, such as GPS coordinates, at the database.

As indicated above, an AR element of an object in an embodiment may be determined based on the attribute(s) of the object. For instance, an embodiment may show one or more of an ID, a nickname, a title, an icon, an image, a 2D or 3D visual effect, a URL, or the latest post on a social media profile such as Facebook®, Twitter®, or Instagram®, that is/are associated with the object, as the AR element. In such embodiment, an object may have multiple associated AR elements, and the AR element of the same object displayed on an AR image may be different at a different time. For instance, an object in an embodiment may have a predetermined setting regarding when to present which AR element, such as an emoji during the day and another emoji at night, a title of the user during the weekdays and a nickname during the weekends, a visual effect for 7-8 pm and another visual effect for 8-9 pm, and so forth.

Finally, an AR element in an embodiment is preferably anchored to the associated object based on the attributes) of the objects and scaled and oriented based on the relative location and an orientation of the object. For instance, in such an embodiment, the visual effect of an object preferably moves and becomes larger/smaller when relatively speaking, the object is moving closer/farther to/from the mobile device. Similarly, in this embodiment, the visual effect of the object preferably changes its direction and/or orientation according to the relative change in the object's direction and/or orientation.

Apparatus for Detecting Objects and Displaying the Objects with their Associated AR Effects Another preferred embodiment is a mobile device that includes an object registering module, an object tracking module, and an AR rendering module. The preferred embodiment may be a cell phone, a tablet, a portable game console, a head-mounted displaying device, and so forth.

The object registering module of this preferred embodiment is configured to repeatedly detect, by one or more sensors/transceivers of non-visible RF signals, one or more objects located within a vicinity of the embodiment, one by one or in a batch, and register the detected objects to a database, as in Step 1 of the embodiment illustrated above. The object tracking module of this preferred embodiment is configured to repeatedly track a location of each of the objects located within a vicinity of the mobile device, relative to the mobile device, as in Step 2 of the aforesaid embodiment. This embodiment may be configured to adopt triangulation, trilateration, GPS locating, real-time locating, beacon tracking system, and/or any suitable locating methods known in the art.

As to the AR rendering module of this preferred embodiment, like in Steps 3-5 of the first preferred embodiment, it is configured to generating in real time an AR element of each of the objects located inside a visual scan area and show the AR image rendered with the AR element anchored to each of the objects located inside the visual scan area on a display of the embodiment. As in the first preferred embodiment, each object of this preferred embodiment has an AR type, which is either LARI or non-LARI. For the objects with an LARI AR type, the AR rendering module of this embodiment too would only render an AR effect in a predetermined area: between a cut-out area and a boundary, at least one of which is defined entirely or partially by TBUs.

In an alternate embodiment, the mobile device may be configured to only render LARI AR elements and not non-LARI AR elements, or vice versa. In yet another embodiment, some TBUs may be used as reference points for a cut-out area and a boundary for an AR element of an object at the same time, i.e. a periphery of the cut-out area and that of the boundary meet at the TBUs, such as a sunflower shaped AR element with the boundary being the ray florets portion and the cut-out area being the disk florets portion. In an embodiment where an object may be associated with multiple LARI AR elements, some TBUs may be used by more than one LARI AR element to define the boundaries and/or the cut-out areas One object of this invention is to provide a method, apparatus, or system for rendering a LARI AR element in a boundary that is surrounding, partially or entirely, the associated object and has at least one see-through cut-out area.

Another object of this invention is to provide a method, apparatus, or system for rendering AR elements associated with objects, visible or hidden, in the vicinity of a mobile device.

BRIEF DESCRIPTION OF THE DRAWINGS

FIGS. 20-24 show schematic views of an embodiment and its various features.

FIGS. 26-29 show various schematic views of an embodiment for property recovery.

FIGS. 30A-C show schematic views of an embodiment for various rescue scenarios.

DESCRIPTION OF THE EMBODIMENTS

Figure 1:
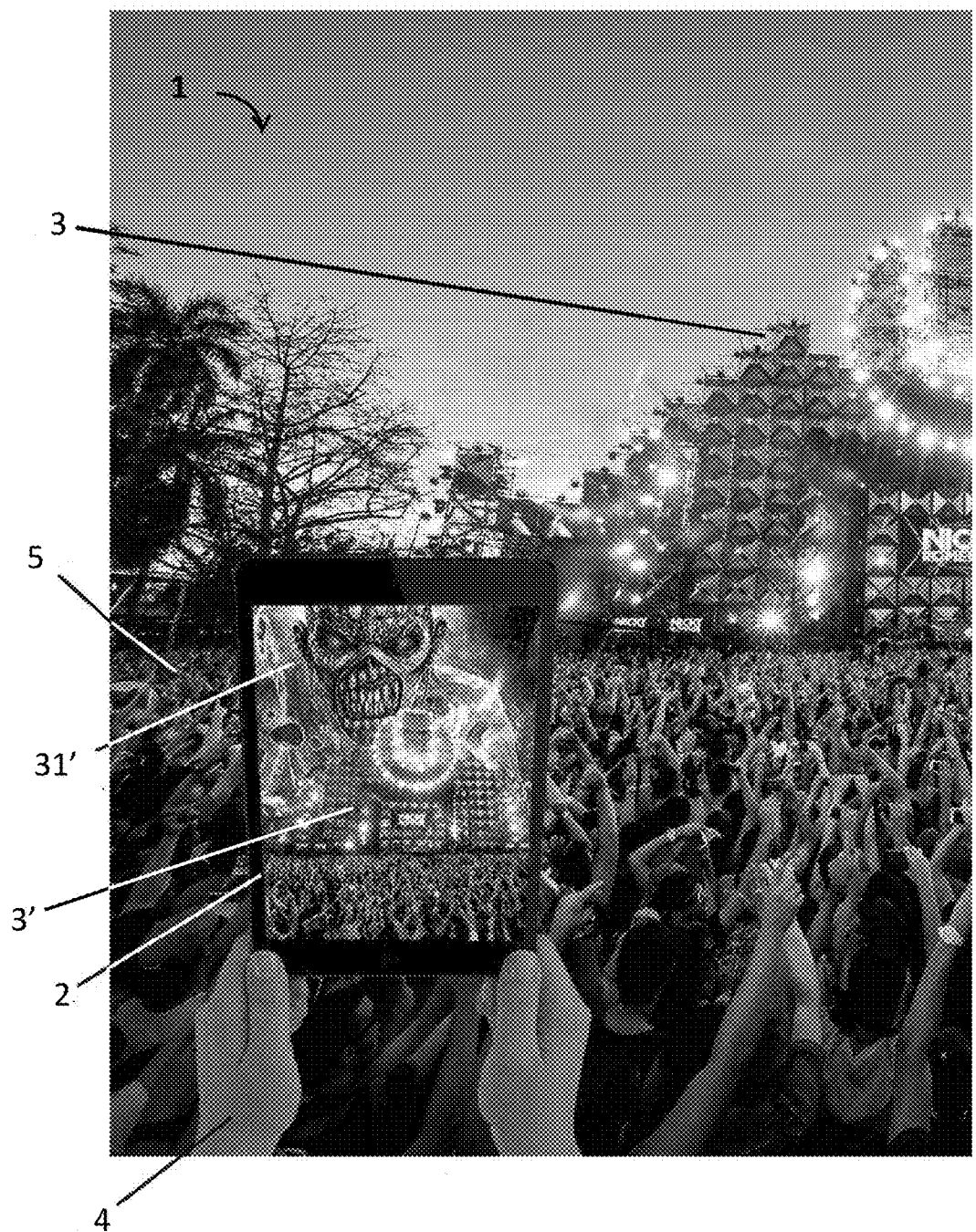
FIG. 1 shows a photographic representation of a first embodiment with a mobile device rendering LARI visual effects within the boundary, excluding the cut-out area, of the AR element of an object (the stage) on the display of the mobile device.
Figure 2A:
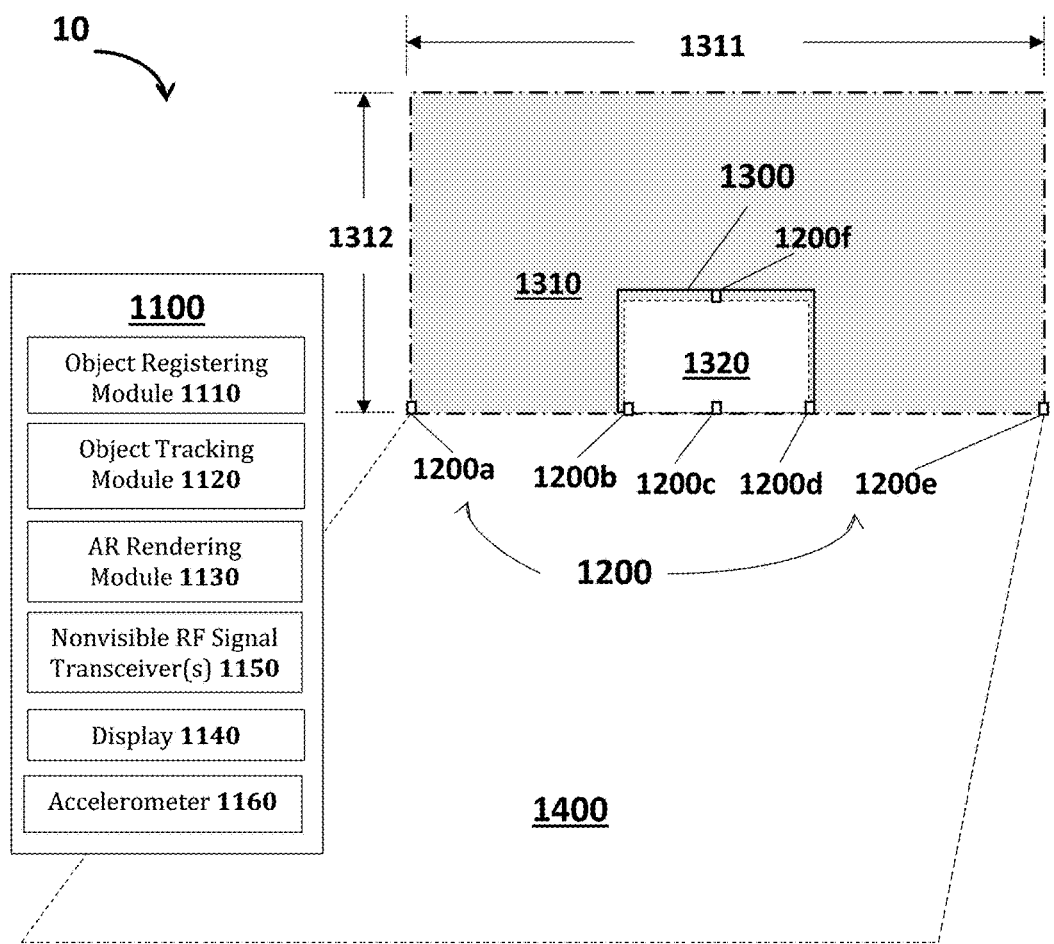
FIGS. 2A & 2B show a second embodiment configured to render and display the AR element of an object in an environment (a stage in a concert) on a display of a mobile device, the boundary and the cut-out area of the LARI AR element being projected as they would appear on the display.
Figure 2B:
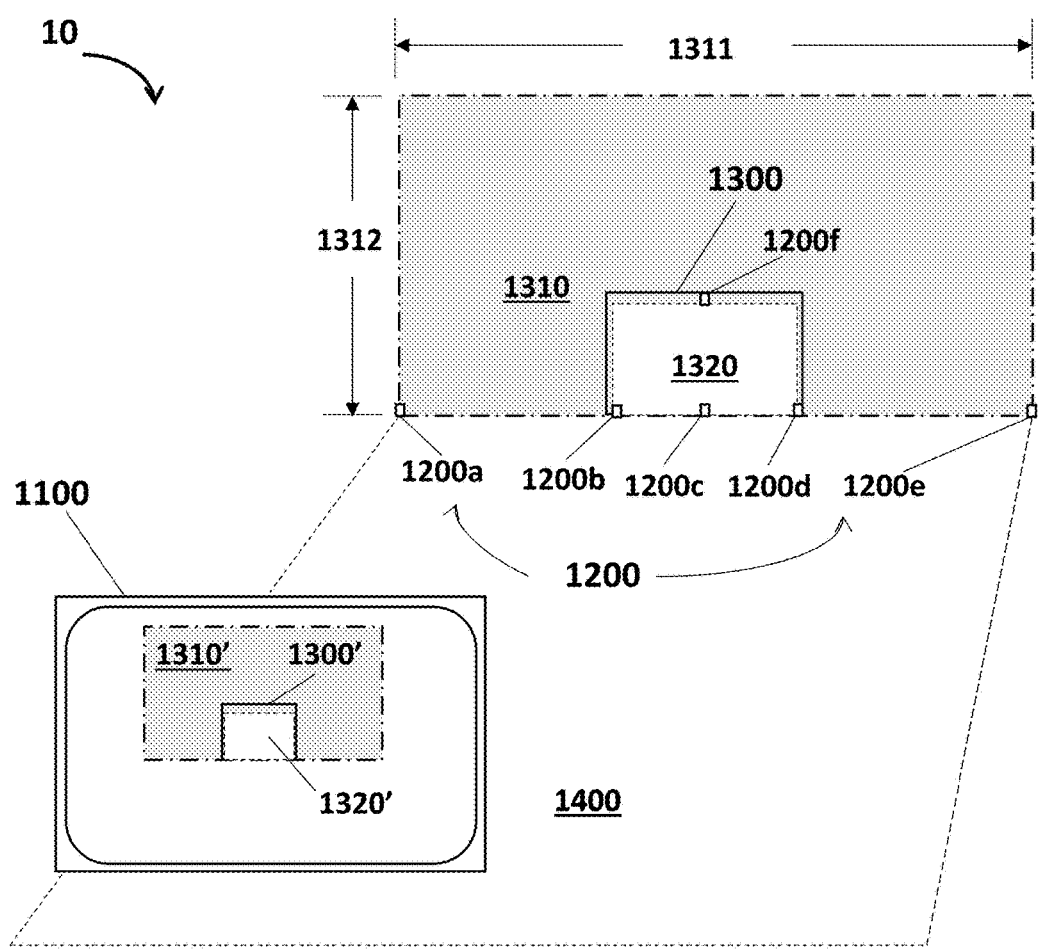

Several embodiments are illustrated in FIGS. 1-32. An exemplary embodiment 1 is shown in FIG. 1 with a mobile device 2 rendering and displaying an AR image with real-world objects captured by its camera (not shown) and an AR element 31' around the image 3' of the stage 3. The AR element 31' of this embodiment 1, shown in FIG. 1, is a 3-dimensional (3D) large AR image (LARI). In alternate embodiments, an AR element can be a still image, a changing still image, or animated motion capable AR content. In this embodiment 1, the AR element 31' associated with the stage 3 is determined by either the audio video operator, the venue operator, the band management, or the band members, and may be changed any time (in real time or at a pre-determined timed sequence).

FIGS. 2-6 show a similar embodiment, the preferred embodiment 10, that comprises a mobile device 1100 with an object registering module 1110, an object tracking module 1120, and an AR rendering module 1130, and multiple non-visible RF signal Transmission Broadcast Units (TBUs) 1200 configured to provide reference points for the mobile device 1100 to identify the projected boundary 1310 and the projected cut-out area 1320 and render a LARI AR element of an object (the stage) 1300, inside the boundary 1310', with the image of the stage 1300 partially seen through the cut-out area 1320'.

Figure 6A:
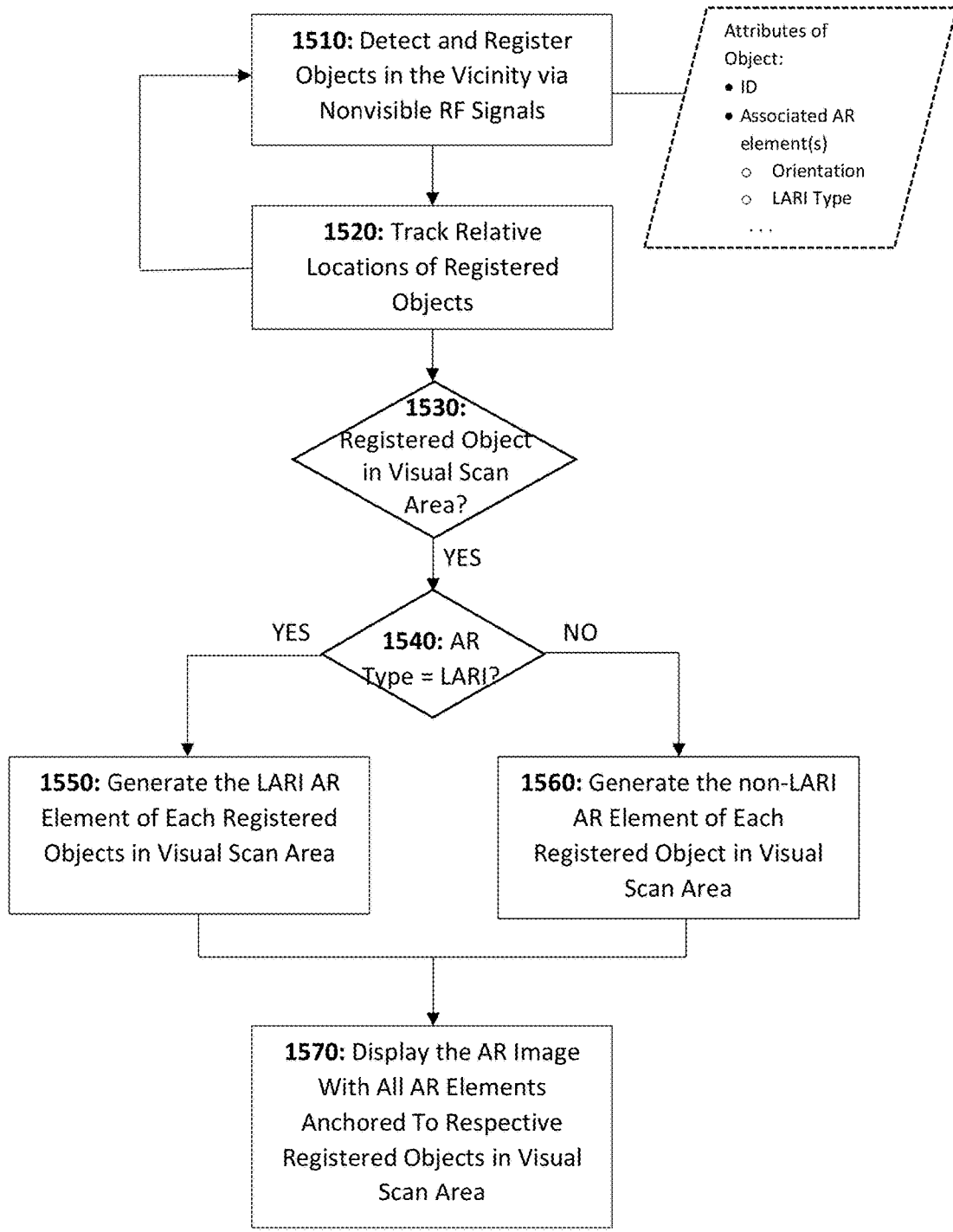
FIGS. 6A-6B show exemplary flow charts of some steps implemented in the second embodiment.
Figure 6B:
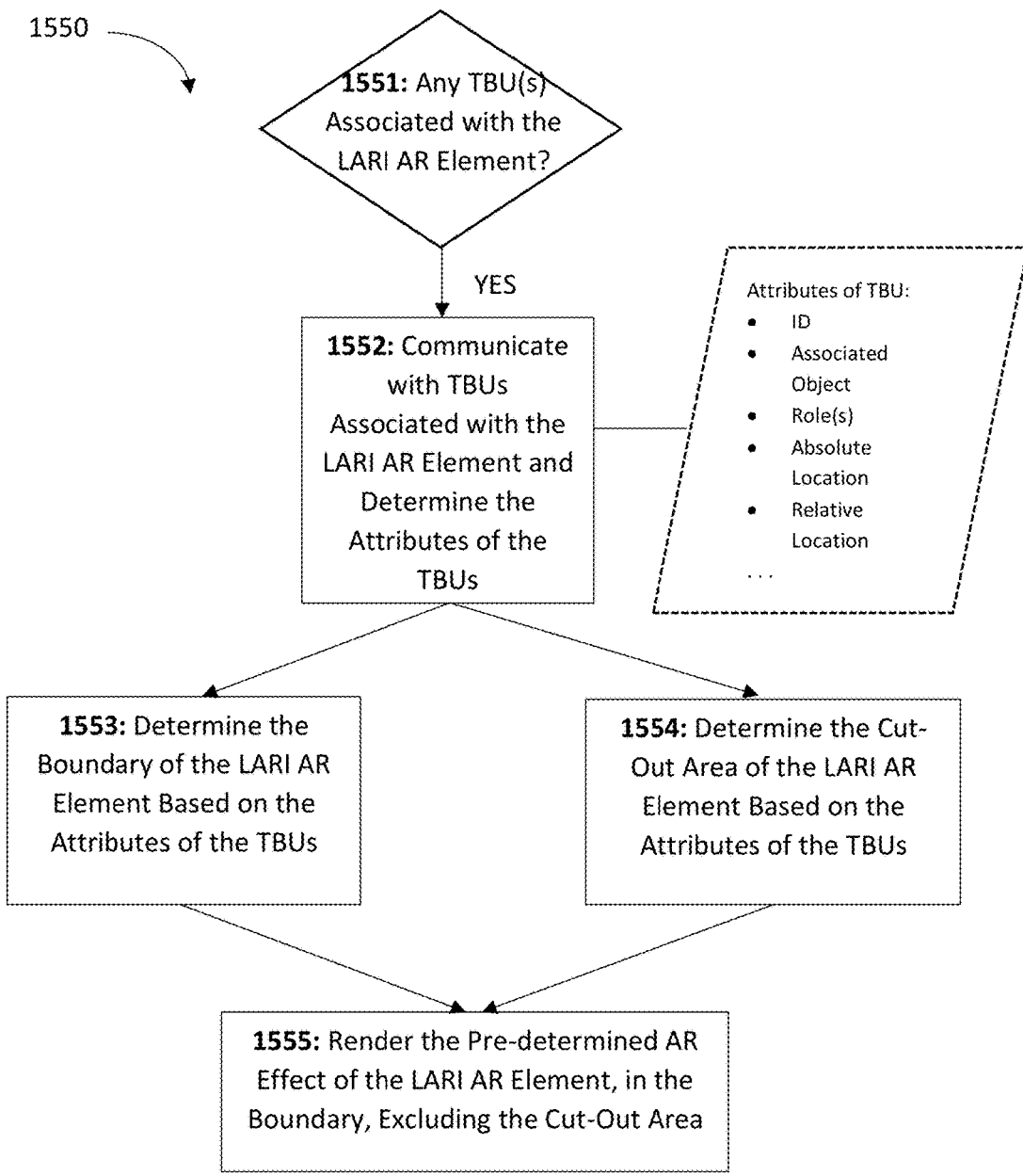

The object registering module 1110 of this preferred embodiment 10 is configured to identify the stage 1300 by one or more transceivers 1150 of the mobile device 1100 and communicate with the stage 1300 by non-visible RF signals (see, e.g., Step 1510 in FIG. 6A). As aforementioned, various wireless technologies using non-visible RF signals may be adopted for the object registering module 1110 to identify and communicate with an object (the stage 300 here). The ranges of non-visible RF signals are limited, and thus it is preferred that the embodiment 10 adopts suitable non-visible RF signals according to the properties, such as the dimensions, of the concert stadium or site 1400 for the best results in terms of the quality of communications between the mobile device 1100 and the stage 1300 or the TBUs 1200 wherever the mobile device is in the stadium or site 1400. In this preferred embodiment 10, the object registering module 1110 is configured to communicate with the stage 1300 and the TBUs 1200 by Bluetooth beacon transmissions in a small park 1400.

In an embodiment, an object with a LARI AR element may include a long-distance RFID or a device configured to communicate with a mobile device, and the RFID/device may or may not be one of the TBUs. In this embodiment 10, the stage 1300 is configured to use one of the TBUs (1200f) to provide its ID and other attributes to the mobile device 1100. Once the object registering module 1110 finds the stage 1300, the object registering module 1110 registers the stage 1300 at the memory of the mobile device 1100 (see, e.g., Step 1510) and the object tracking module 1120 continuously tracks where the stage 1300 is, relative to the mobile device 1100 (see, e.g., Step 1520). In this embodiment 10, the object tracking module 1120 preferably tracks the relative location of the stage 1300 by trilateration and triangulation with at least three of the TBUs having known attributes, including their locations (e.g., Cartesian coordinates) and roles (e.g. the reference point at the left bottom corner of the projected boundary 1310) (see, e.g., Steps 1551-1552).

Figure 4:
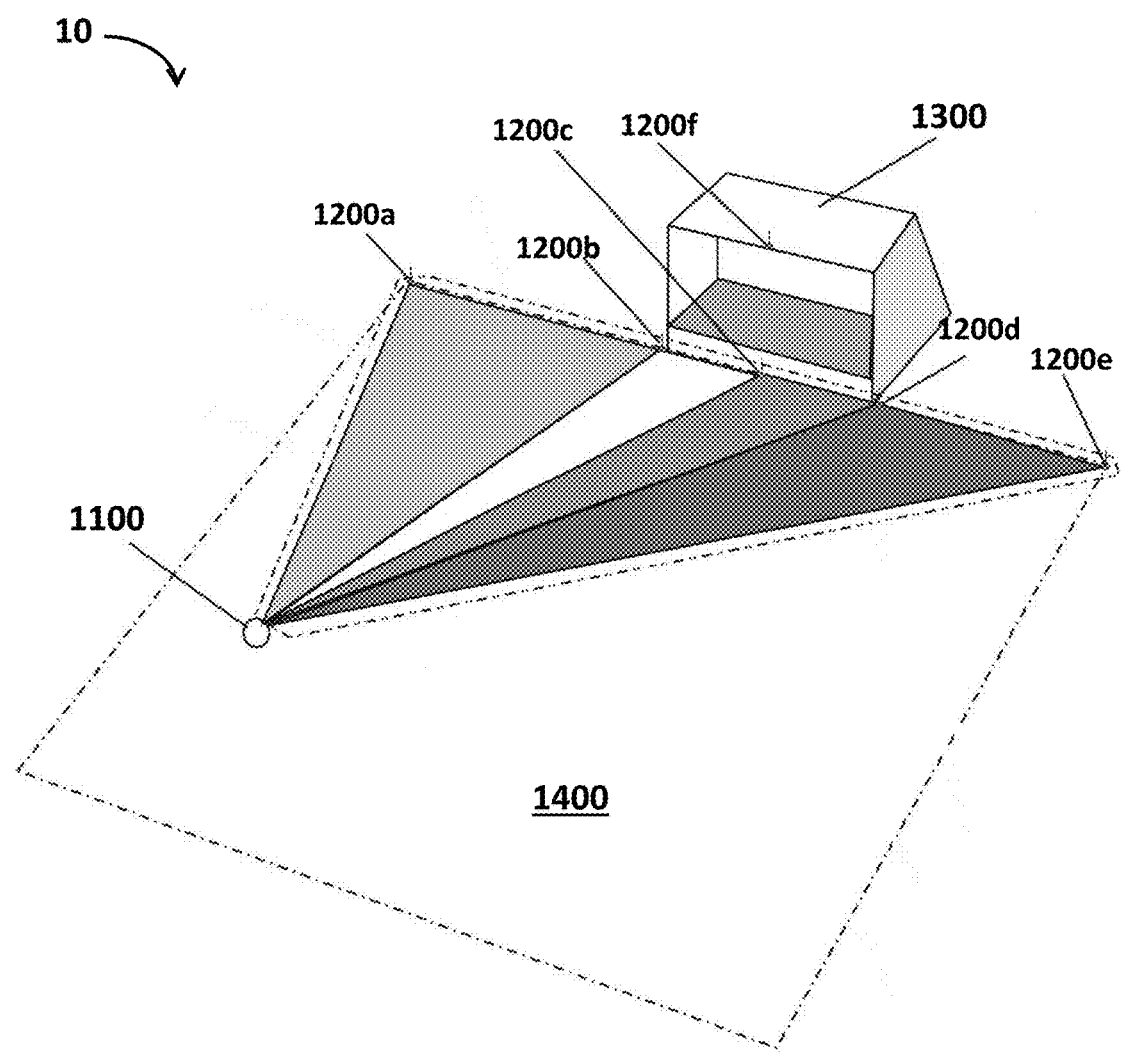
FIG. 4 shows another schematic view of the second embodiment, with the distances between the mobile device and the TBUs at the bottom of the projected boundary of the stage's AR element shown.
Figure 5:
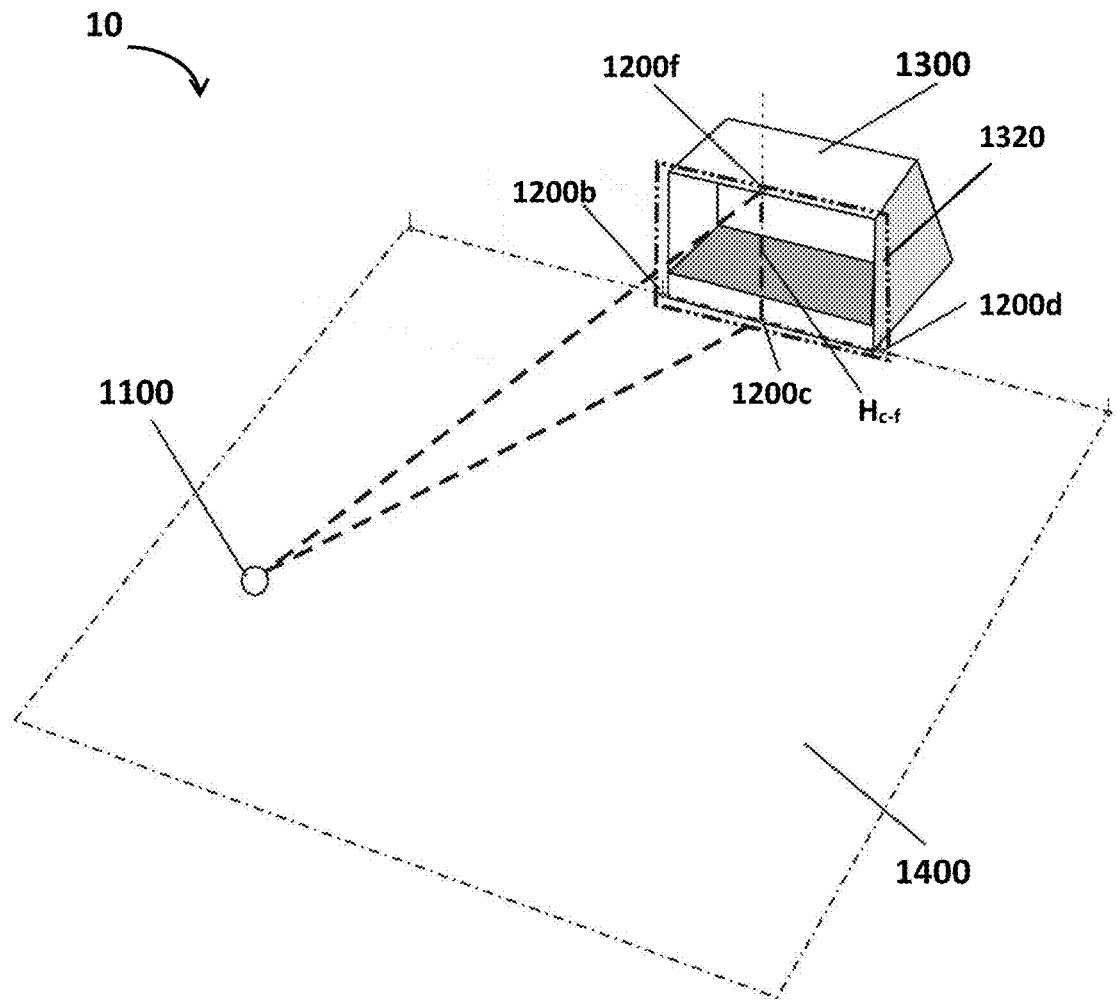
FIG. 5 shows another schematic view of the second embodiment, with the distances between the mobile device and two TBUs at the periphery of the projected cut-out area of the stage's AR element shown.

In this embodiment 10, as stated above and shown in FIGS. 4-5, the distances between the mobile device 1100 and each of the TBUs 1200 can be determined based on the respective response time of non-visible RF signals (with identifying information) from the TBUs 1200 in any corresponding communications—beginning from the time the mobile device 1100 transmitting any inquiry/response in a non-visible RF signal to a TBU 1200 to the time it receives a reply/inquiry in the non-visible RF signal from the TBU 1200 (assuming that the processing time can be ignored). Furthermore, the directions of the TBUs 1200 relative to the mobile device 1100 (i.e. the angles between a line formed by a TBU 1200 and the mobile device 1100 and the axes of a reference coordinate system) can be determined based on the directions of the non-visible RF signals that reach the mobile device 1100 first. Since the locations/coordinates of the TBUs 1200 are predetermined, the distance/angles between each pair of the TBUs 1200 are thus known, and the distances/angles between the mobile device 1100 and the TBUs 1200 are determined by response time, the location of the mobile device 1100 can be determined by trilateration and/or triangulation.

In addition, as illustrated in FIGS. 2-6, according to the predetermined "roles" of the TBUs 1200, TBUs 1200a, 1200b, 1200c, 1200d, and 1200e are located at the bottom edge of the projected boundary 1310 of the stage 1300, and TBUs 1200b, 1200c, 1200d, and 1200f are located at the peripheral of the rectangular cut-out area 1320 of the stage 1300. In this embodiment 10, at least the shape and height 1312 of the projected boundary 1310 and the shape (a rectangle) of the projected cut-out area 1320 are predetermined and provided to the mobile device 1100 as attributes of the stage 1300.

In Step 1553 of the AR Rendering Module 1130, as the projected boundary 1310 being a 2D rectangle standing vertically (such information stored and provided by the stage 1300 in this embodiment 10, as the attributes of the AR element), the TBUs 1200a & 1200e being at the opposite bottom corner (such information stored and provided by the TBUs 1200), the width 1311 of the projected boundary 1310 can be determined (i.e. the distance between TBUs 1200a and 1200e) and the locations of the other two corners and the area of the projected boundary 1310 can be determined as well. Additionally, with the distances and angles between the mobile device 1100 and the TBUs 1200s determined as illustrated above and the relative orientation of the stage 1300 determined, based on the orientation of the mobile device 1100 (provided by the accelerometer 1160 and the stage 1300) and that of the stage 1300 (provided by the stage 1300), the boundary 1310' of the stage image 1300' of the stage 1300 in the AR image can be determined.

Figure 3:
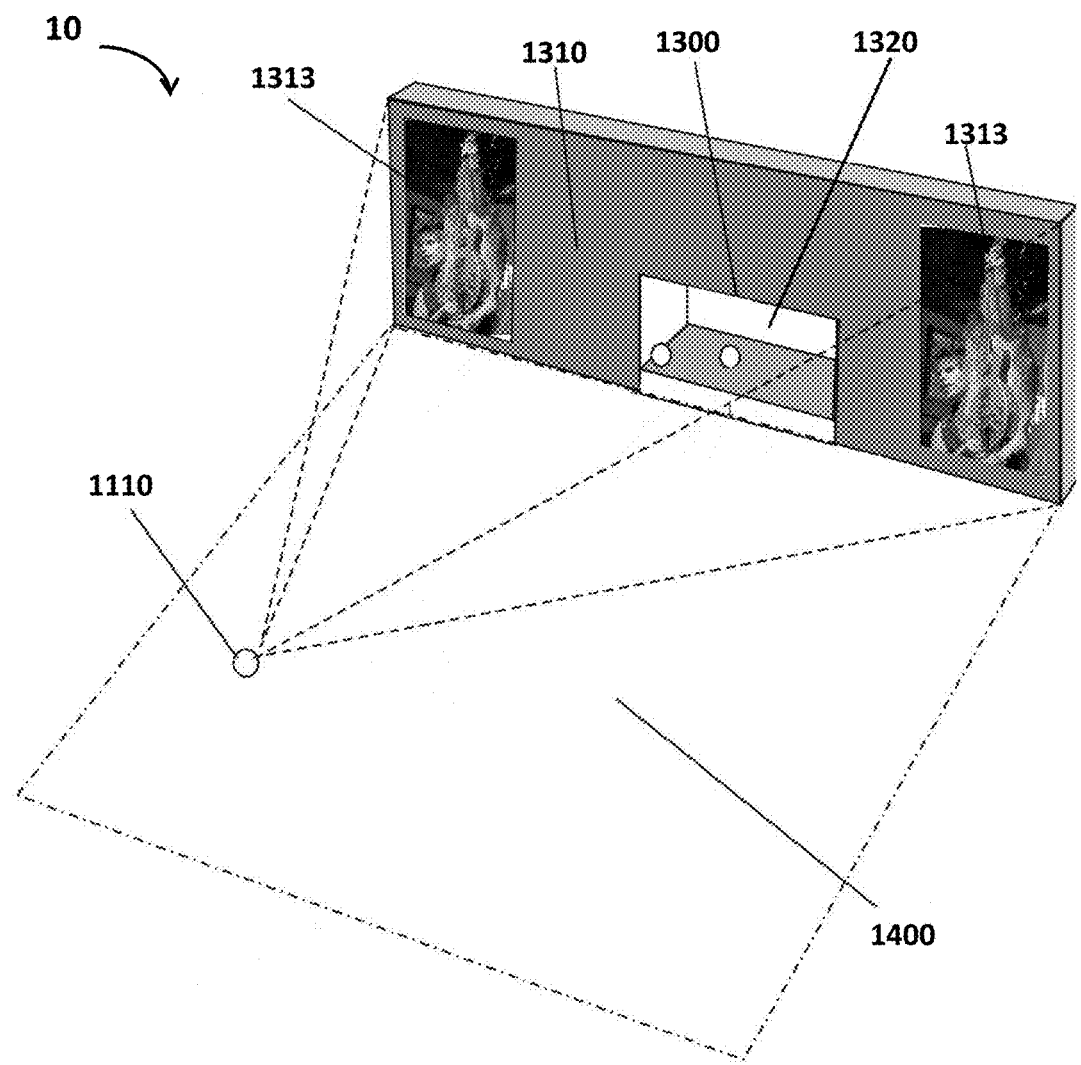
FIG. 3 shows a schematic view of the environment (the concert) for the second embodiment, with the LARI visual effects and the object (stage) presented as they would be shown on the display.

Similarly, as the cut-out area 1320 being a 2D rectangle standing vertically, the TBUs 1200b and 1200d at the opposite bottom corners, and the height of the cut-out area 1320 being the distance between the TBUs 1200c and 1200f, the width, height, the corners, and the whole projected cut-out area 1320, as well as the cut-out area 1320' of the stage image 1300' of the stage 1300 in the AR image, can be determined accordingly. With the boundary 1310' and the cut-out-area 1320' determined, the AR Rendering Module 1130 is further configured to display/superimpose the predetermined AR effect of the stage 1300 in the boundary 1310' while not affecting/blocking the portion of stage image 1300' in the cut-out area 1320' (see, e.g., Step 1555 & FIG. 3). In FIG. 3, the AR effect 1300 is two real-time videos streamed from a remote server (not shown). In a different embodiment, or in the embodiment 10 at a different time, the AR effect of the stage 1300 can be a flaming skull as in FIG. 1, another still image, or other animations.

Figure 7:
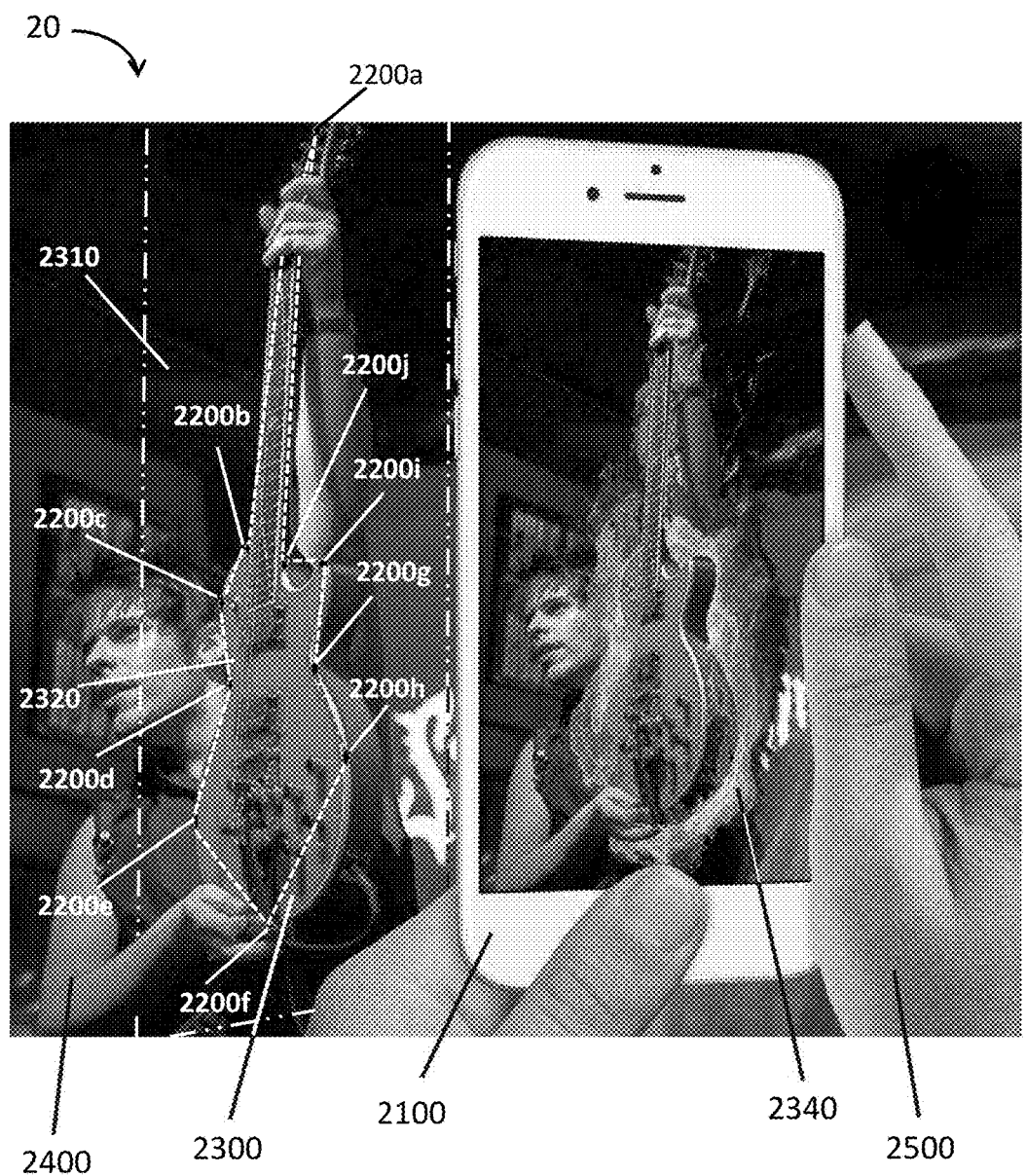
FIG. 7 shows a photographic representation of a third embodiment with a mobile device rendering LARI visual effects within the boundary, excluding the cut-out area, of the AR element of an object (the guitar) on the display of the mobile device.

FIG. 7 shows an alternate embodiment 20 that comprises a mobile device 2100 (a cell phone here), and TBUs 2200 located around a guitar 2300 and configured to depict the projected cut-out area 2320. In this embodiment 20, the mobile device 2100 obtains the information about the projected boundary 2310 from the guitar 2300. For instance, the shape of the projected boundary 2310 can be determined by the relative distances between the projected boundary 2320 and the TBUs 2200, or the projected boundary 2310 can be as simple as at least one rectangular prism with predetermined distances from some or all of the TBUs 2200 (e.g. 2200a and 2200f only as in FIGS. 7; 2200a, 2200e, 2200f, 2200h, 2200g, 2200i, and 2200j; or all of the TBUs 2200a-j).

Since the AR effect of an LARI-type object is superimposed, depending on the implementation and the AR effect associated with the object, when the AR effect is somewhat translucent or only takes some portions of the boundary, as shown in FIG. 7, the boundary can be as big as it needs to accommodate different types of AR effects of the same AR element 2340.

Figure 8:
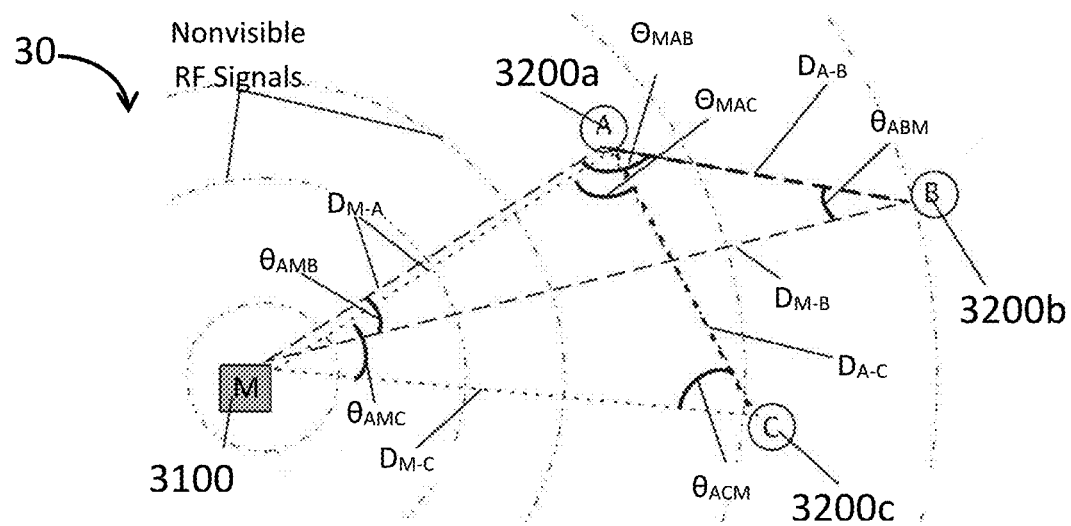
FIG. 8 shows a schematic view of an embodiment with a mobile device, configured to locate and track the location of an object by referring to the locations of other objects.
Figure 9:
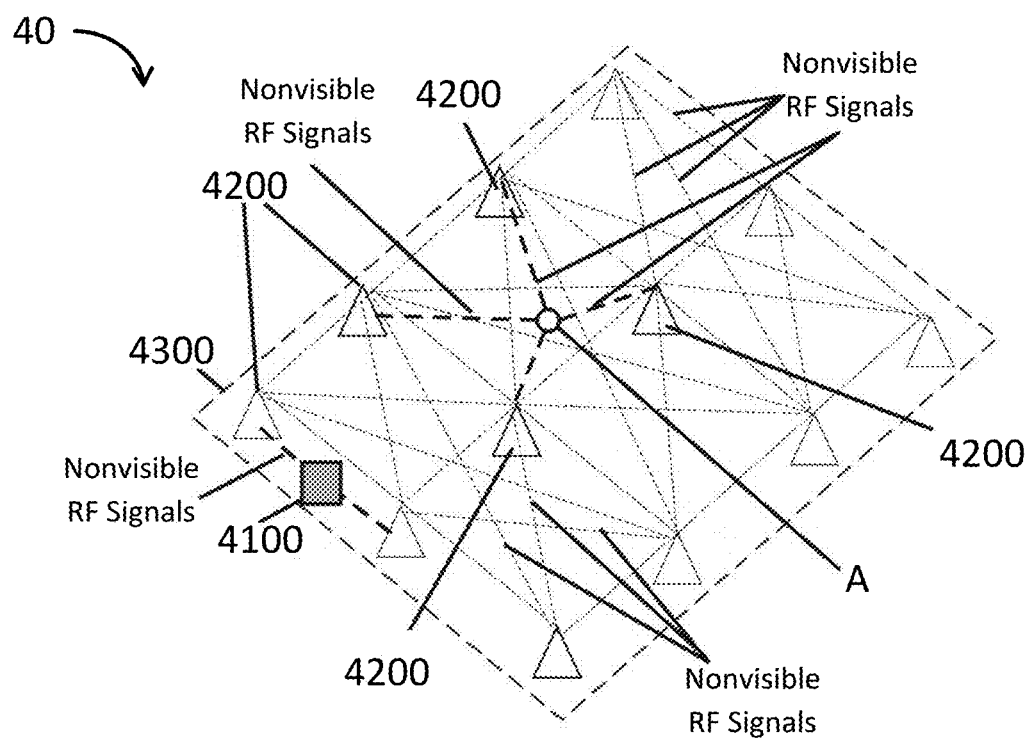
FIG. 9 shows a schematic view of another embodiment with a mobile device, configured to locate and track the location of an object by referring to a grid of radio beacon stations.
Figure 10:
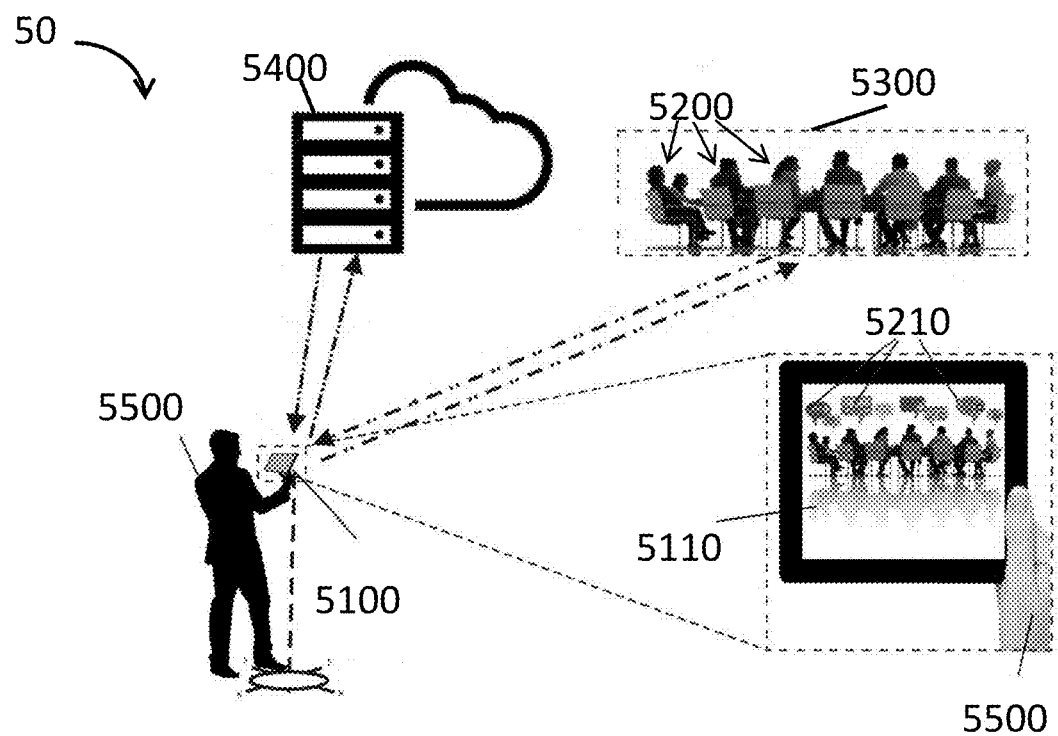
FIGS. 10 & 11 show schematic views of an embodiment with a mobile device, configured to track multiple objects and render an AR image with AR elements anchored to the associated objects.
Figure 11:
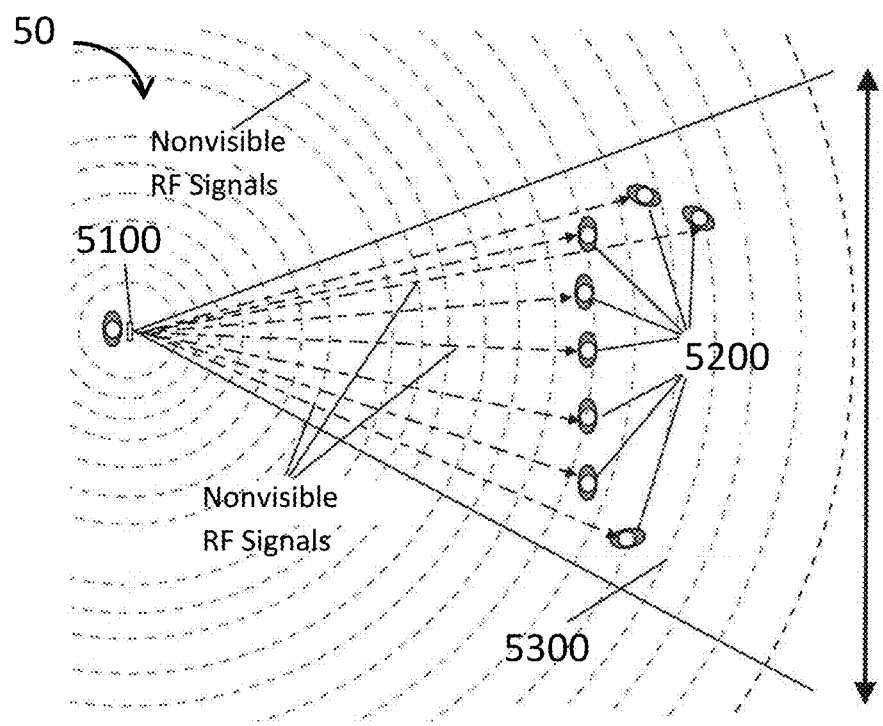
Figure 12:
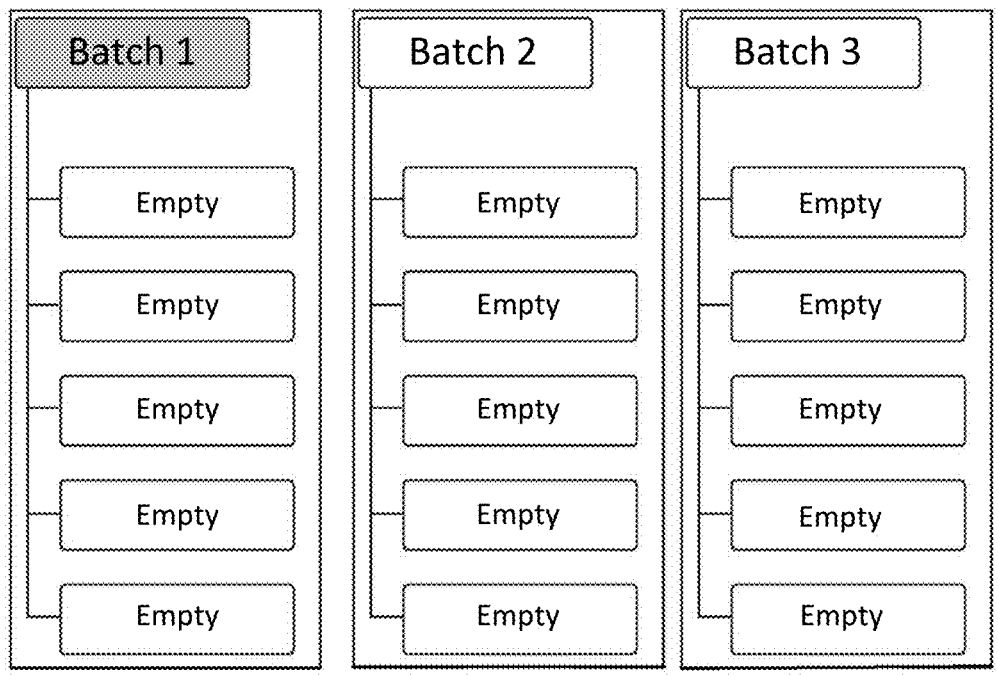
FIGS. 12-13 show a schematic view of the embodiment in FIGS. 10-11 in which the mobile device is further configured to track multiple objects in batches and a representation of the data structures of the information associated with the registered/tracked objects in this embodiment.
Figure 13:
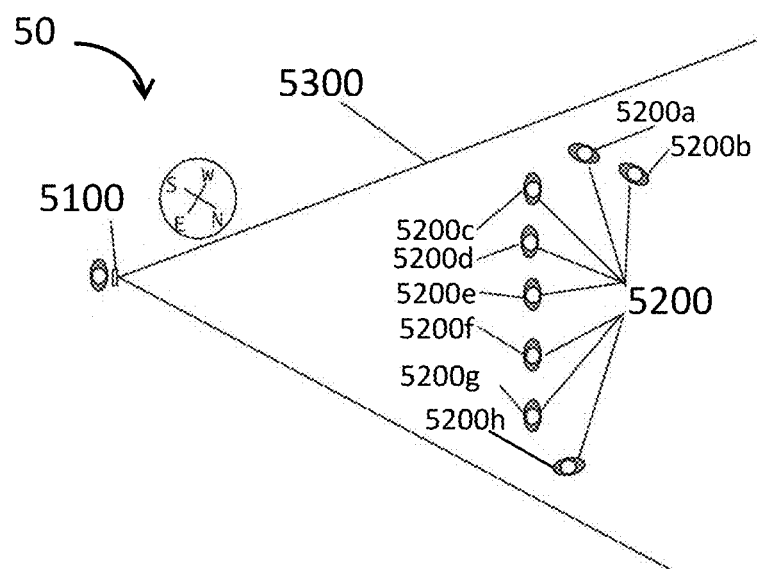
Figure 14:
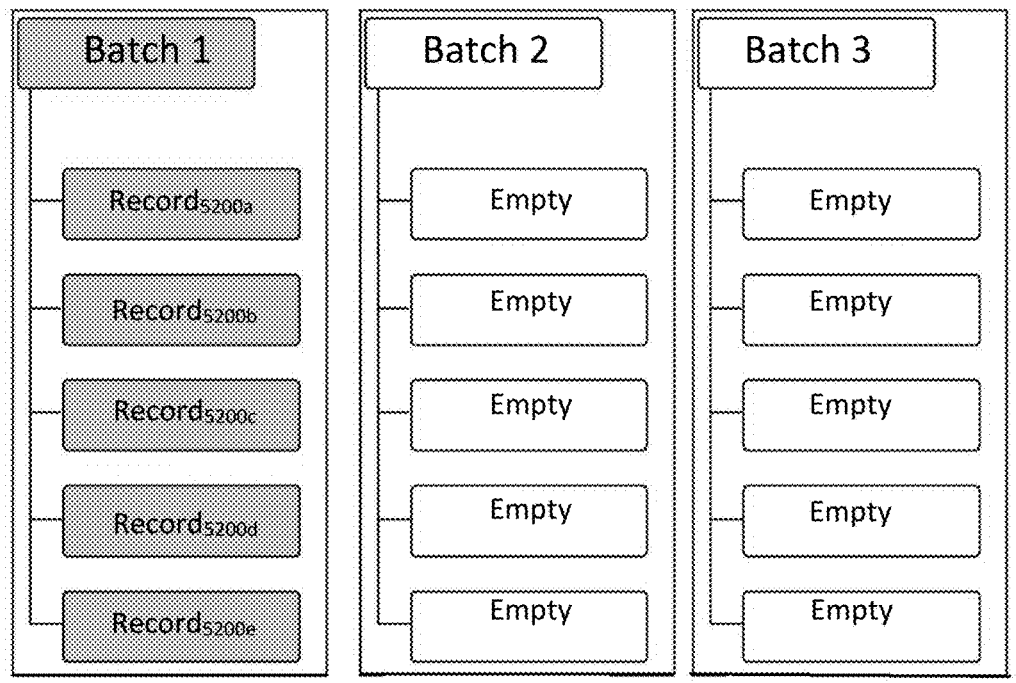
FIGS. 14-19 show alternate schematic views of the embodiment in FIGS. 10-13 and representations of the data structures of the information associated with the registered/tracked objects in different states.
Figure 15:
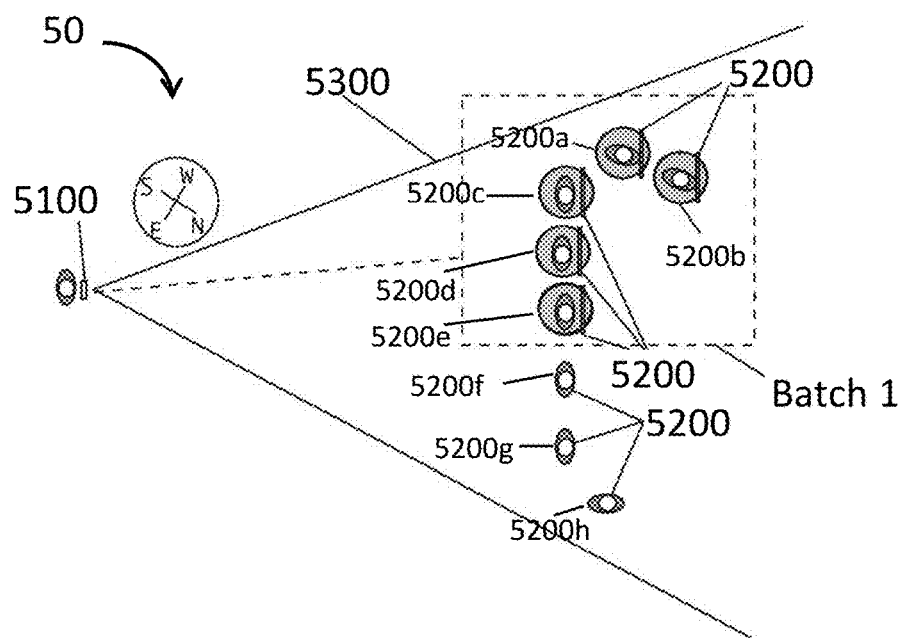
Figure 16:
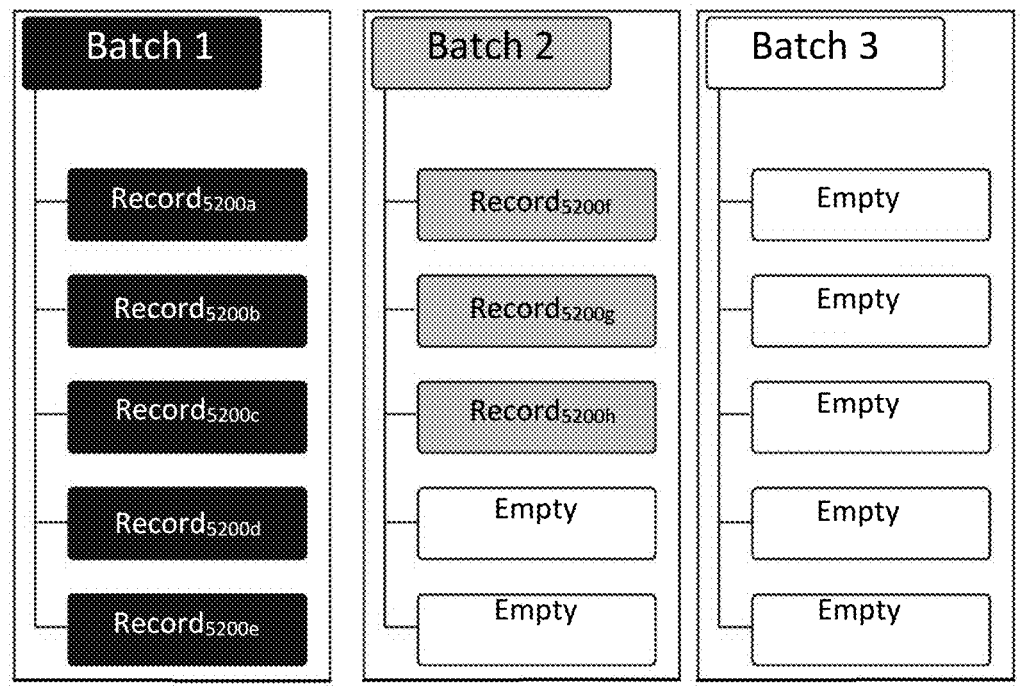
Figure 17:
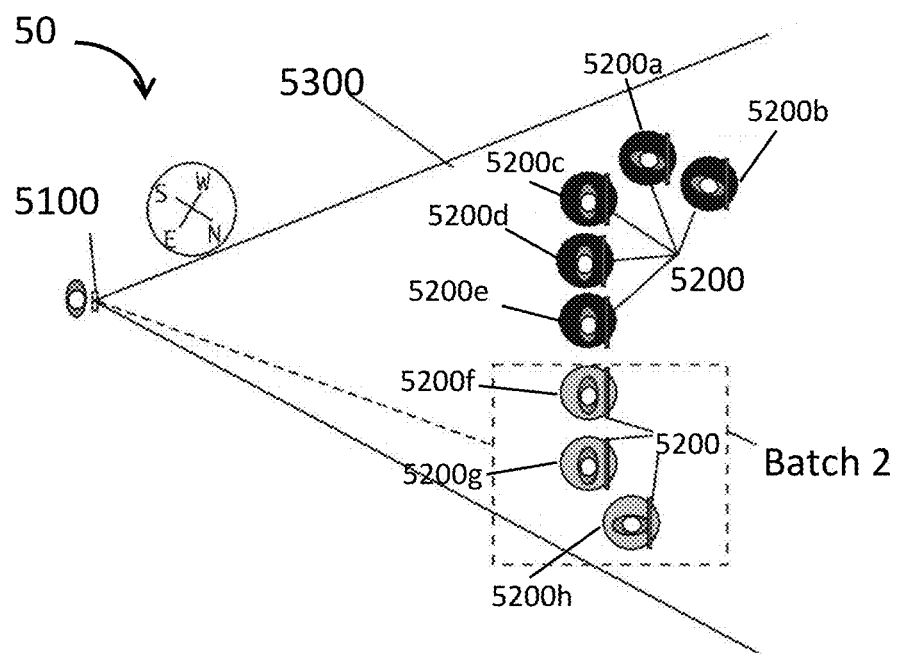
Figure 18:
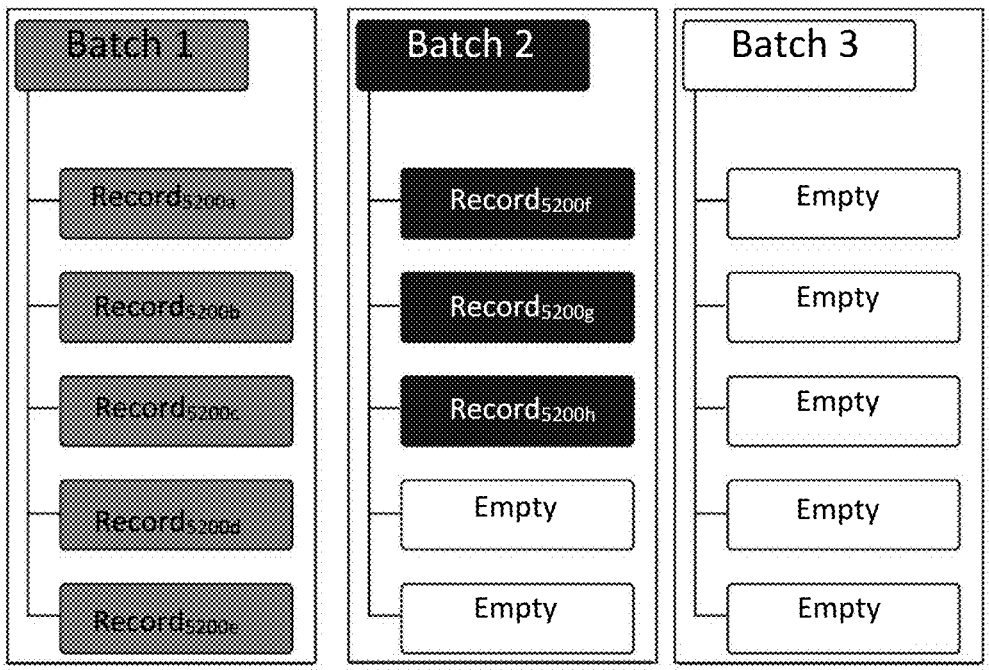
Figure 19:
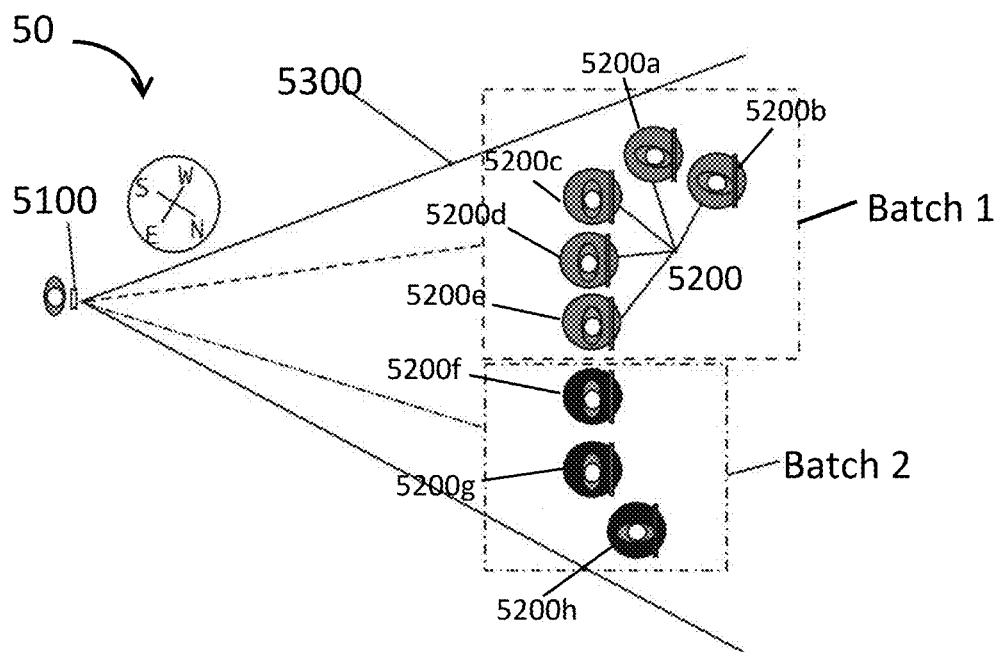
Figure 22:
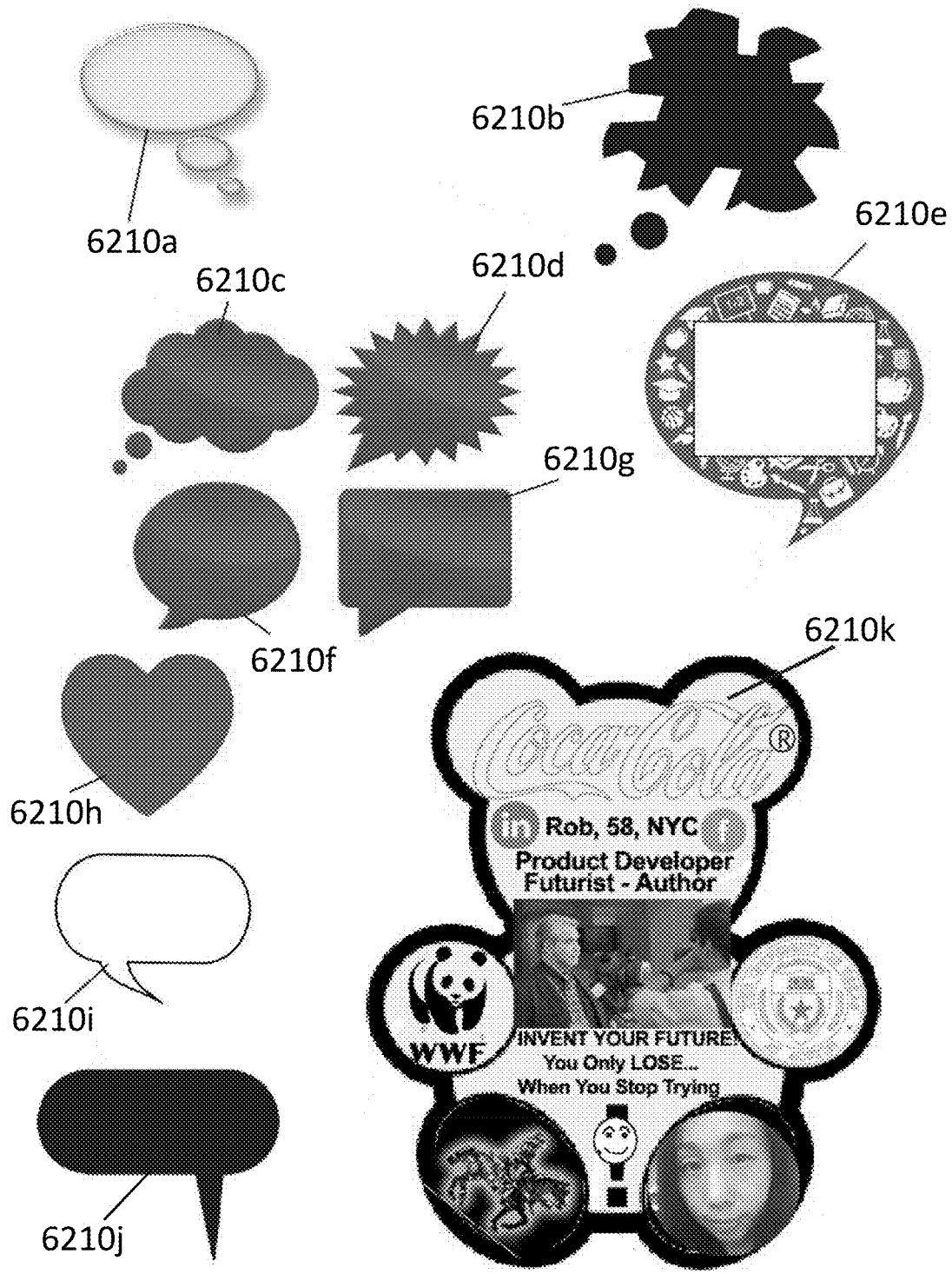
Figure 23:
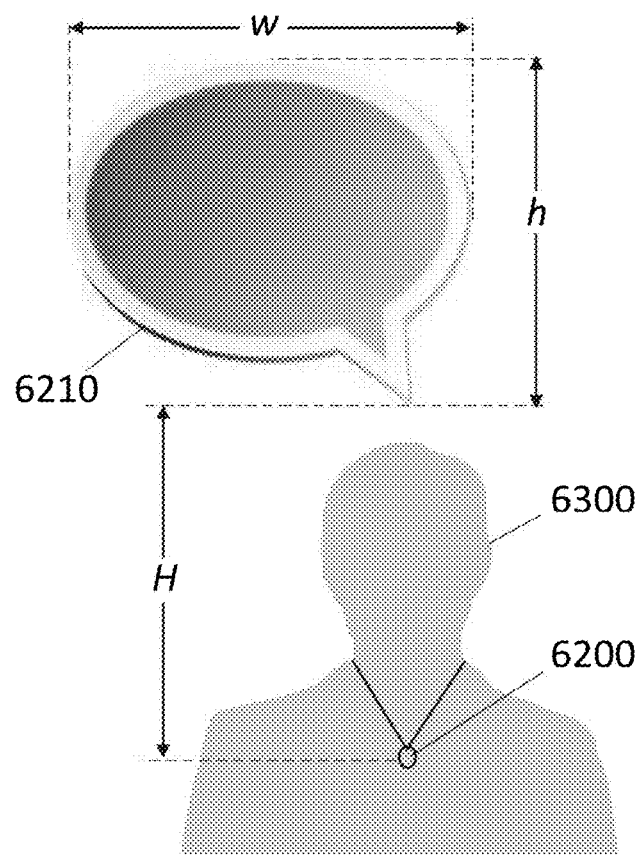

FIGS. 8-9 shows alternate embodiments 30 & 40 with different ways to determine the relative locations of objects. In embodiment 30, the mobile device 3100 is configured to locate object C by reference to objects A and B with known locations in a 2-dimensional reference coordinate system. That is, the mobile device 3100 is configured to first determine the relative locations/coordinates of A and B by finding the coordinate of the mobile device 3100 in the reference coordinate system by trilateration and triangulation with A and B and subtracting the coordinates. Then, the mobile device 3100 is configured to determine the relative location of object C by trilateration and triangulation with A.

In embodiment 40, the mobile device 4100 is configured to determine the relative location of object A by referring to the radio beacon stations 4200 in a grid of known locations. In this embodiment 40, object A is configured to determine its own location by referring to the radio beacon stations 4200 and provide its coordinates to the mobile device 4100. With the coordinates of the mobile device 4100 determined in a similar way and those of object A known, the mobile device 4100 can simply subtract the coordinates to determine the relative location of object A. Alternatively, if object A is not configured to provide its location, the mobile device 4100 is further configured to refer to a radio beacon station 4200 and use trilateration and/or triangulation to determine the coordinates of object A.

Furthermore, in an embodiment, the mobile device may be configured to scan, register, and track multiple objects at the same time. For instance, the mobile device 5100 of embodiment 50 in FIGS. 10-19 is configured to scan and register up to 5 objects in a batch and display some pre-authorized information (e.g., the name, status, links to social media profiles, and so forth) associated with each object. An exemplary environment of this embodiment 50 is a convention where professionals meet up and exchange information. Each of the participants is given a badge 5200 configured to provide basic information of the participant (e.g., the name, resident city, state, and/or country, employment information, the ID of the participant's social media profile(s), and so forth) for a mobile device 5100 to display in a thought bubble with this information above the participant's head on the display 5110. Alternatively, the badge 5200 may provide a unique ID for the mobile device 5100 to obtain the information of a participant that the participant previously provided and stored at a remote server 5400.

In such embodiment 50, the mobile device 5100 is configured to start scanning from the left to the right (or alternatively from west to east or vice versa), as shown in FIGS. 12-19. Among the objects/badges 5200 in the visual scan area 5300 responding to the inquiry non-visible RF signals, the first 5 badges 5200 (i.e., 5200a-e) that the mobile device 5100 registers are those respond from its left, then the mobile device 5100 goes on to register the next batch of 5 badges 5200 (i.e., 5200f-h), and so on, until there is no more badges 5200 unregistered in the visual scan area 5300. After the badges 5200 in the visual scan area 5300 are registered, the mobile device 5100 is further configured to render and display the AR elements 5210 associated with the registered badges 5200 near the badges 5200 (e.g., 3 feet above the badges 5200).

As stated above, the AR element 5210 associated with the badge 5200 of a participant in this embodiment 50 is a thought bubble with the participant's name, title, role/category, employment information, one or more of the IDs of the participant's social media profiles, and/or the city, state/province, and country of the participant. In an alternate embodiment, the AR element may include a text, an image, an animation, a video, a URL, and/or various combinations thereof. Furthermore, the information to be displayed in an AR element in an embodiment, and its presentation, may be predetermined by the embodiment or customized by the participant and/or the user of the mobile device. For instance, the shapes of each thought bubble 5210 in this embodiment 50 may be chosen by the participant. Alternatively, the user of the mobile device in an embodiment may decide that what colors of the AR elements are based on the titles, roles, or resident regions/countries of the participants.

Additionally, the mobile device 5100 is preferably further configured to rescan the badges 5200 in the visual scan area 5300 periodically (e.g., every 0.1-0.5 seconds) and make sure that registry of the badges 5200 (Record$_{5200a}$-Record$_{5200h}$), including the location of each badge 5200 and the information associated with it, is up to date. That is, if the user moves the mobile device 5100 away or turns the mobile device 5100 to a different direction or some participants wearing the badges 5200 move out of the visual scan area 5300, the mobile device 5100 is configured to determine that all or some of the badges 5200 originally registered are no longer in the visual scan area 5300 and/or some badges 5200 newly appear in the visual scan area 5300, and update the registry, as well as the AR image, accordingly.

Moreover, the mobile device of an embodiment may be further configured to interact with the objects found (or more specifically, for the user of the mobile device to interact with the persons or things associated with the objects through social media, messaging, etc.). FIGS. 20-21 show an exemplary embodiment 60 with a mobile device 6100 configured to scan, register, and track one or more objects 6200 (e.g., RF tags) within the vicinity of the mobile device 6100 in a convention and display the AR element(s) 6210 associated with each of the objects 6200 on its display. Here, the AR element 6210 may include a background, a short text, an emoji, a logo with a URL link to an associated social media profile, and so forth, and a participant 6300 may be allowed to select what and how to show at his/her AR element 6210 (see, e.g., various AR element templates or samples in FIG. 22).

In this embodiment 60, the mobile device 60 is further configured to provide a user interface 6110, as a part of the AR image 6120, to allow the user of the mobile device 6100 to select an AR element 6210 (i.e., by checking 6111 "Select Bubble" and clicking on a certain AR element 6210), to interact with the participant 6300 associated with the selected AR element 6210 by following (6112), commenting (6113), liking (6114), or sending a message (6115) to the participant 6300 on social media. If the user of the mobile device 6100 specifically wants to find the employees of a certain company or the participants from a certain market (e.g., a targeted buyer of the user's products), the mobile device 6100 may be further configured to include a discriminator or a filter on the user interface 6110 (e.g., by checking 6116 and entering the criteria in 6117) to show only the AR elements 6210 of the participants 6300 that the user wants to see.

Additionally, it is preferred that while the AR element 6210 may have a default location relative to the associated object 6200, e.g. right above the object 6200, the mobile device 6100 is configured to arrange multiple AR elements 6210 to avoid overlapping. As shown in FIG. 21, the AR elements 6210 are anchored to the associated objects 6200 while being at the same height above the floor and arranged to avoid overlapping. Alternatively, the mobile device 6100 may be configured to adjust the height of an AR element 6210 based on the location of the object 6210. For instance, in FIG. 23, the bottom of the AR element 6210 is H inches above the object 6210. Alternatively, another embodiment may be configured to display the AR element in a location relative to the person/thing bearing the object. For instance, if an AR element is to be displayed above a person's right shoulder, the mobile device may be configured to first scan the person's image and determine where the right shoulder is. The technologies of such image processing are known in the art and thus omitted from discussion here.

Figure 24:
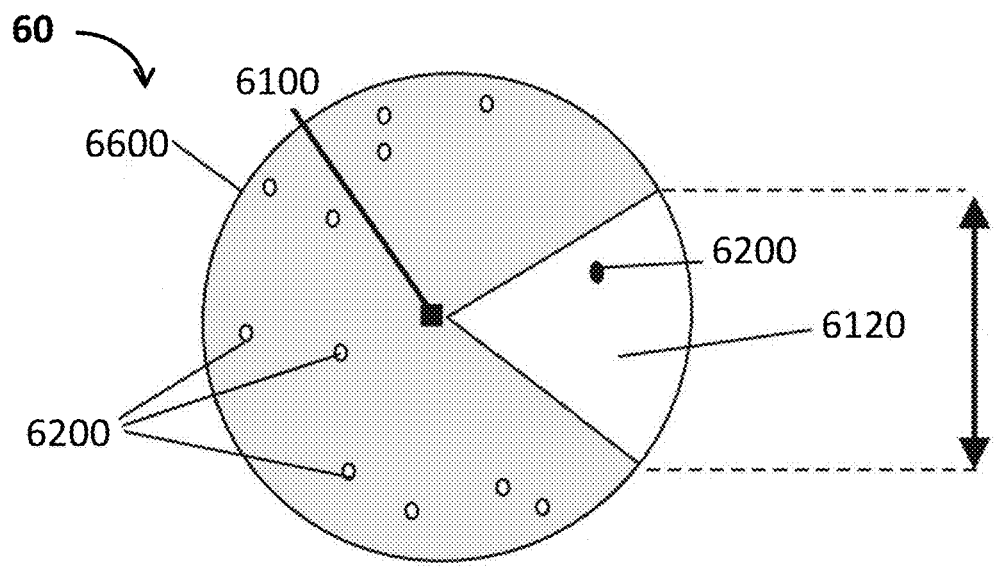
Figure 25:
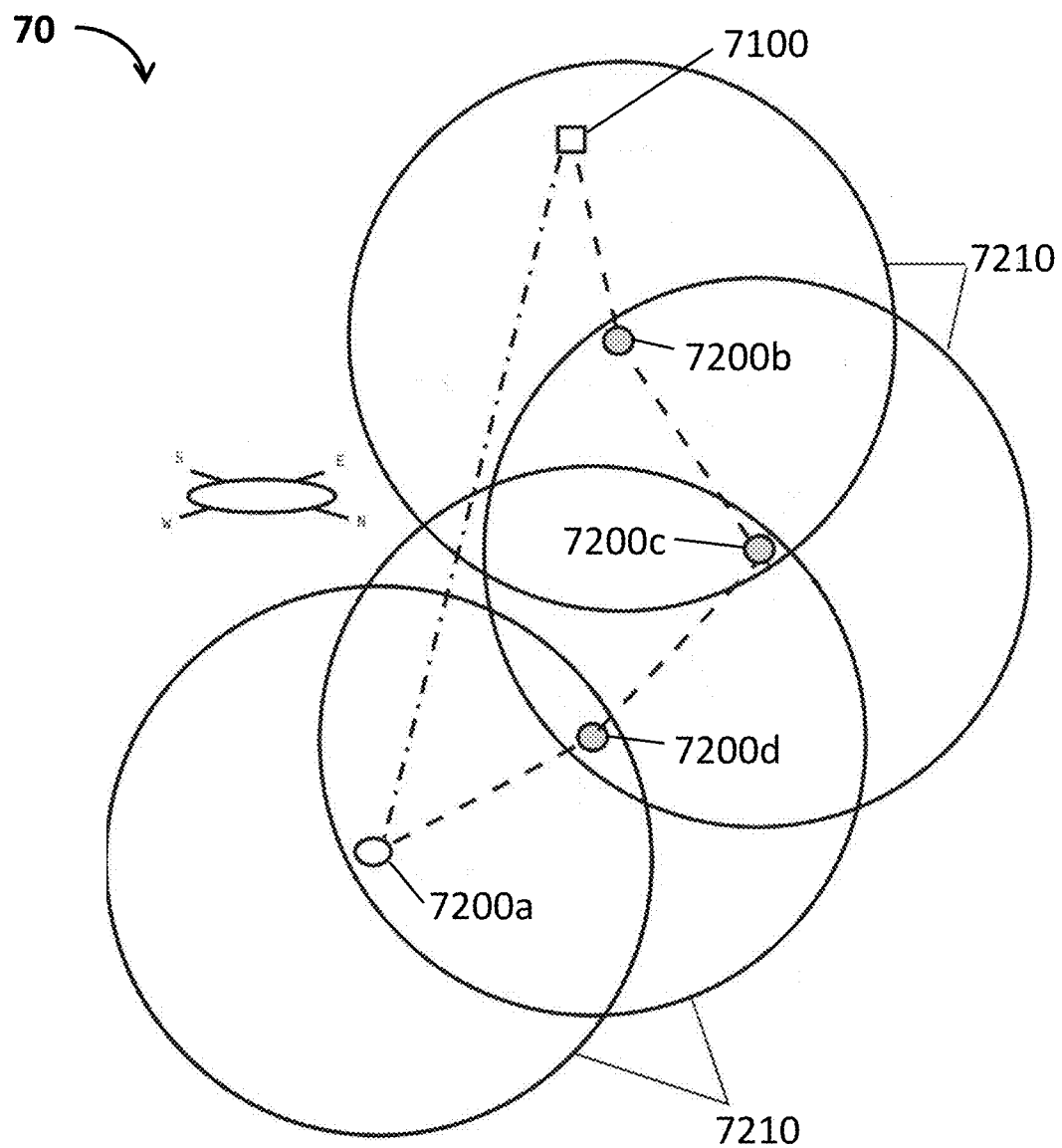
FIG. 25 shows a diagrammatic view of an embodiment with a mobile device configured to track another device using interlaced searching.
Figure 26:
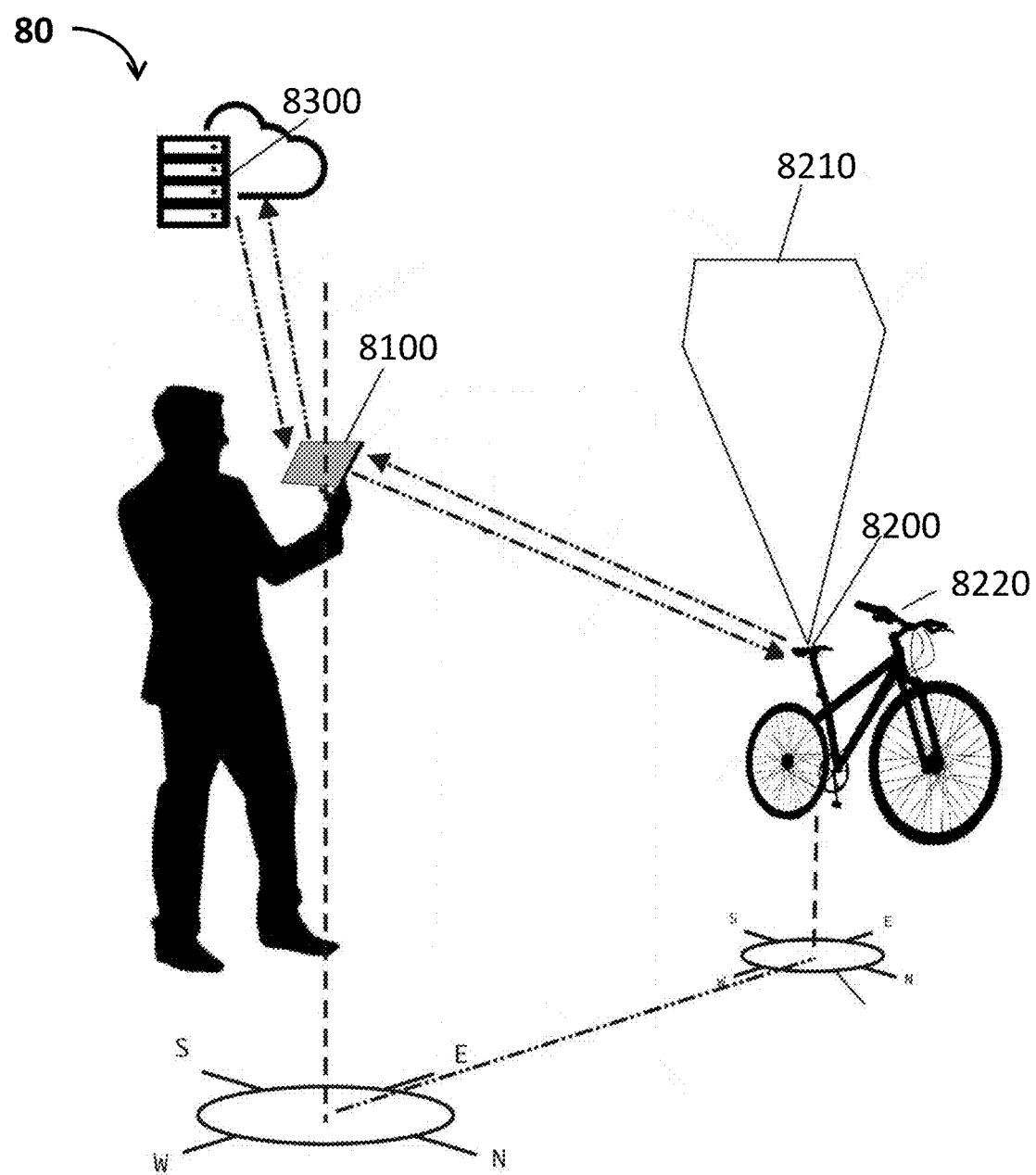

As stated above, a mobile device in an embodiment may scan, register, and track objects nearby even though they are not in the visual scan area. As shown in FIG. 24, the mobile device 6100 of the embodiment 60 is configured to detect and track all objects 6200 within the range of nonvisible RF signals 6600, including the visual scan area 6120. An embodiment may additionally include a search function to locate an object not within the vicinity of the mobile device via an interlaced searching system. In FIG. 25, when the mobile device 7100 determines that the object 7200a is not nearby, the mobile device 7100 is configured to broadcast a search request using non-visible RF signals for other objects 7200 in the vicinity (e.g., 7200b, 7200c, and 7200d in this example) to try to locate the object 7200a in their respective RF signal ranges 7210. This sequence of broadcastings stops when the object 7200d finally hears back from the object 7200a. Then either the objects 7200b-d are configured to report to the object from which it receives the search request until the location of the object 7200a is finally provided to the mobile device 7100, or the object 7200a may be configured to communicate directly with the mobile device 7100 via other means, such as sending a message through a remote server.

FIGS. 26-29 show another embodiment 80 for recovering lost properties, such as bicycles, televisions, cell phones, computers, furniture, automobiles, and so forth. This embodiment 80 may comprise a mobile device 8100 configured to identify one or more objects/tags 8200 attached to the properties 8220 that might be hidden from view, by communicating with the tags 8200 via long range non-visible RF signals. Once a tag 8200 is identified, the mobile device 8100 is further configured to request the AR element 8100 of each of the identified tags 8200 from a remote database 8300, and then render and display the AR elements 8210. The remote database 8300 may be maintained by the police department or a private entity that charges certain subscription fees and are preferably accessible only to the authorized police officers or private investigators.

Alternatively, the mobile device 8100 in this embodiment 80 may include a list of lost properties 8300 in its memory and is configured to try to locate and render the AR elements 8210 of only the objects 8200 in the list 8300. Either way, the tags 8200 in this embodiment 80 are preferably long-distance tags, such as battery-powered active RFIDs or GPS trackers, so that the mobile device 8100 may easily locate the lost properties 8220 bearing the tags 8200 within a reasonable distance, preferably no less than 160 feet.

FIGS. 30A-C shows another embodiment 90 for locating victims in various rescue scenarios. The embodiment 90 comprises a mobile device 9100 configured to locate one or more victims wearing long distance trackers 9200 and render AR element 9210 associated with the victims. Like the tags 8200 in the embodiment 80, the trackers 9200 are preferably capable of communicating with the mobile device 9100 via long distance non-visible RF signals that can pass through obstacles such as concrete walls, rocks, water, and so forth.

The AR element 9210 in this embodiment 90 can be as simple as an arrow pointing to the associated tracker 9200, i.e. the victim bearing the tracker 9200, or further include other types of AR effects, such as a LARI AR effect as a circular frame enclosing the location of the victim (not shown). If the tracker 9200 is configured to track not only the location but also the health markers of the person wearing the tracker 9200, the AR element 9210 may further show whether the victim is in a critical condition or not so that the rescue team can prioritize its rescuing efforts.

Figure 31A:
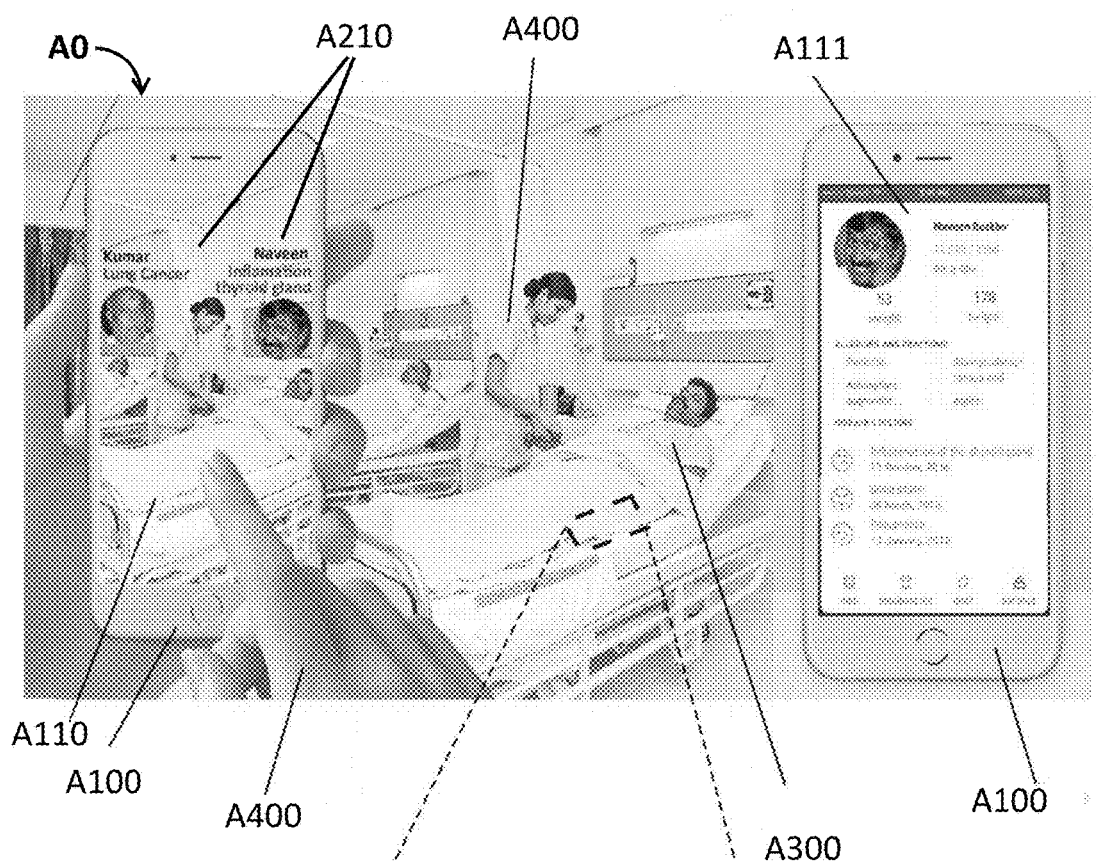
FIGS. 31A-C show a schematic view of an embodiment for monitoring patients' conditions.
Figure 31B:
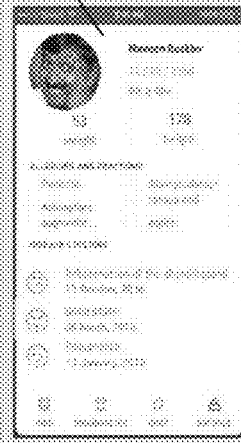
Figure 31C:
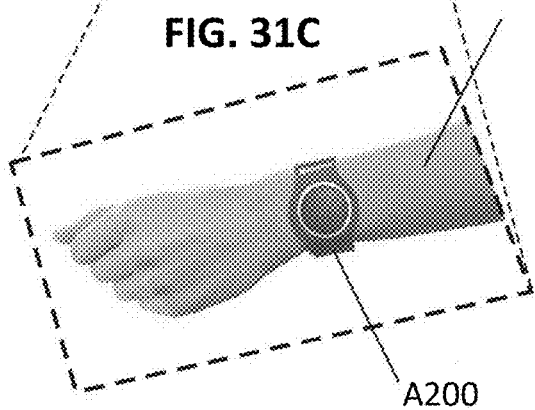

FIGS. 31A-C shows an alternate embodiment A0 for monitoring the patients in a hospital or a nursing home. In this embodiment A0, the doctors, nurses, or other medical staff A400 of the hospital or nursing home can use a mobile device A100 to identify a patient A300 wearing a tag A200 and from this tag A200, obtain the medical history of this patient A300 that is displayed on the mobile device A100. In this embodiment A0, each tag A200 has a unique ID and preferably some basic information of the patient A300 wearing it, such as the name, gender, photo, and age of the patient A300. As in the embodiments illustrated above, the mobile device A100 in this embodiment A0 is configured to identify and track the patients' tags A200 via non-visible RF signals and render the AR element A210 associated with each patient A300 above his/her head in the AR image A110.

The AR element A210 in this embodiment A0, as shown in FIG. 31A, includes the name, reason of hospitalization, and headshot of the patient A300, which may be stored at the tag A200 or a remote database. Furthermore, as shown in FIG. 31B, the mobile device A100 is configured to show the complete medical history A111 of a patient A300 when a user of the mobile device selects a specific patient A300 by clicking near the tag A200 on the display of the mobile device A100.

Figure 32:
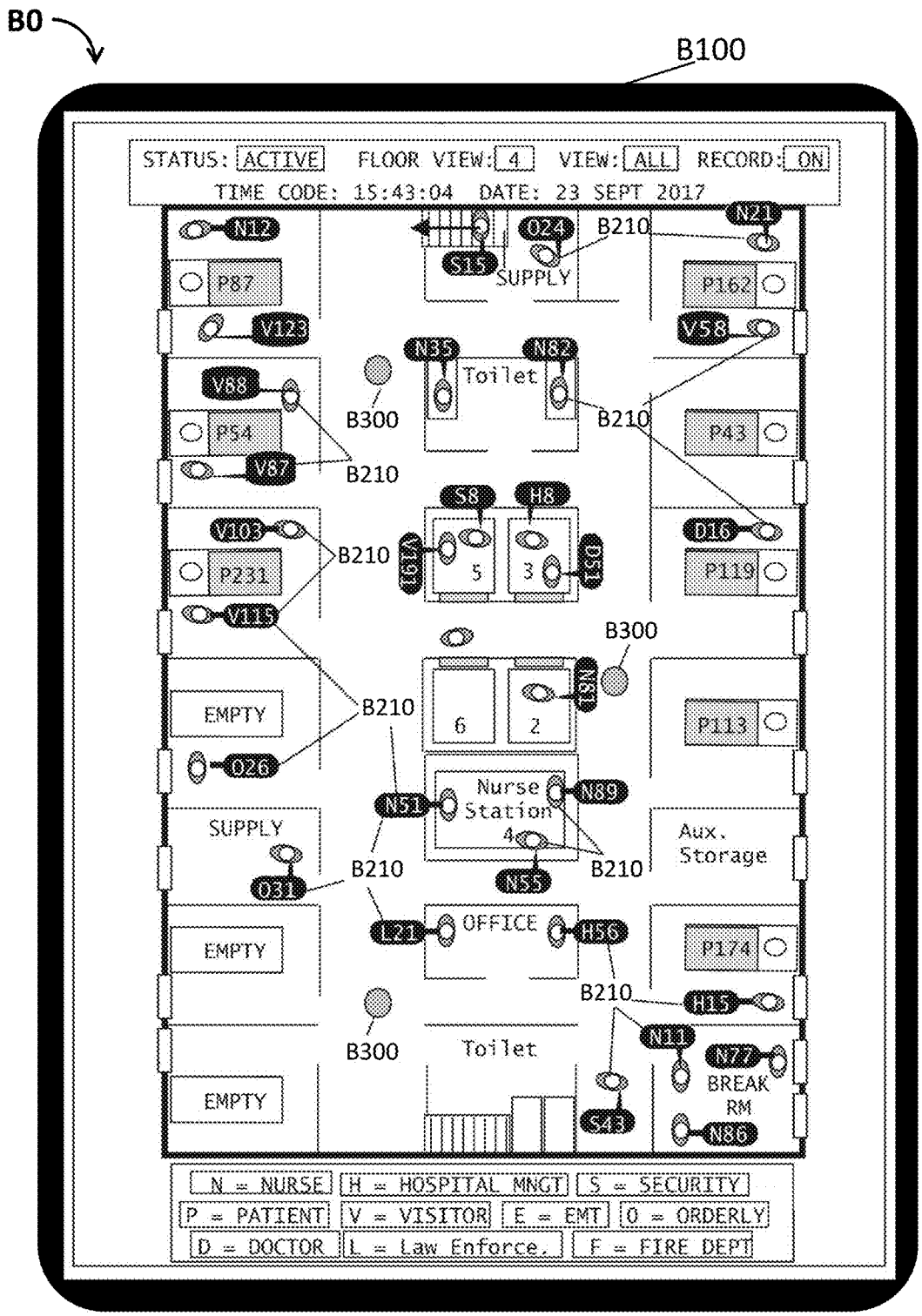
FIG. 32 shows a schematic view of an embodiment for monitoring the whereabouts of all personnel in a facility.

Another embodiment B0 for tracking every person in a hospital, nursing home, prison, or military base for surveillance purposes is shown in FIG. 32. In this embodiment B0, everyone who enters the hospital is required to wear a tag B200 that is tracked by a surveillance system including a mobile device B100, via non-visible RF signals. The mobile device B100 may be configured to obtain the location of each tag B200 in the facility by any of the aforementioned methods: by trilateration and/or triangulation or by reference to a real-time locating server, a beacon system B300, a GPS service, or any suitable geolocation services. Alternatively, a server may be configured to track the tags B200 in the facility and provided the location of each tag B200 to the mobile device B100 in real time. As shown in FIG. 32, the mobile device B100 is configured to show a floor map of the facility with a symbol representing each person and configured to move if the person moves. Additionally, the mobile device B100 is configured to show a bubble B210 anchored to the symbol of each person, the bubble B210 encircling a unique ID of the person.

While the invention has been described by means of specific embodiments, numerous modifications and variations could be made thereto by those ordinarily skilled in the art without departing from the score and spirit disclosed herein. For instance, the non-visible RF signals used in an embodiment may vary based on the environment, such as the size of the concert stadium. The numbers of TBUs needed for different LARI AR elements may be different based on the different properties, such the shapes, of the LARI AR elements.

The invention claimed is:

1. A method for rendering an Augmented Reality (AR) image on a display of a mobile device with one or more objects detected by radio frequency signals, excluding visible spectrum frequencies, ("non-visible RF signals"), the method comprising the steps of:
    (1) repeatedly detecting and registering the objects located within a vicinity of the mobile device, by one or more sensors of the mobile device communicating with the objects by the non-visible RF signals;
    (2) repeatedly tracking a relative location of each of the objects located within a vicinity of the mobile device, relative to the mobile device;
    (3) generating in real time an AR element of each of the objects with an AR type as Large-AR-Image (LARI) and located inside a visual scan area by:

(a) determining a boundary of the AR element, the boundary configured to surround a real-world image of the object;
(b) determining a cut-out area within the boundary, the cut-out area configured to show a predetermined portion of the real-world image of the object, and
(c) rendering an AR effect within the boundary, excluding the cut-out area, the AR effect scaled and oriented based on the relative location and an orientation of the object; and
(4) displaying the AR image rendered with the AR element anchored to each of the objects located inside the visual scan area; and
wherein the cut-out area is determined based on:
a distance between the mobile device and each of multiple transmission broadcast units ("TBUs") locate along a peripheral of a projected cut-out area, the distance determined based on a response time for each TBU to respond to the mobile device via the non-visible RF signals and in a sequence of the TBUs; and
a distance between each pair of consecutive TBUs.

2. The method of claim 1, wherein the step of detecting and registering the one or more objects further comprises the steps of:
(1) simultaneously scanning and registering a batch of the one or more objects located within the vicinity of the mobile device, by the one or more sensors:
(a) broadcasting a single request of a unique identification (ID) by the non-visible RF signals,
(b) receiving an ID of each of the one or more objects by the non-visible RF signals, and
(c) if the ID of an object is not registered in a storage component of the mobile device, including the object as a member object of the batch until reaching a predetermined size of the batch; and
(2) register each member object of the batch by saving the ID and the relative location of the member object to the storage component.

3. The method of claim 2, wherein if a reference object selected from the objects, other than a member object in the batch, exists, the object detecting module is further configured to repeatedly determine the relative location of the member object by performing triangulation with a reference to the reference object based on:
(1) a distance between the mobile device and the member object determined in real time based on a response time for the member object to respond to the mobile device via the non-visible RF signals;
(2) a distance between the mobile device and the reference object determined in real time based on a response time for the reference object to respond to the mobile device via the non-visible RF signals; and
(3) a distance between the reference object and the member object, provided by the reference object, determined in real time based on a response time for the member object to respond to the reference object via the non-visible RF signals.

4. The method of claim 1, wherein the tracking module is further configured to remove a registered object from the storage component if the relative location of the registered object has been outside the visual scan area for at least a predetermined period of time.

5. The method of claim 1, wherein the AR element of each of the objects is generated and displayed only if one or more attributes of each of the objects, retrieved directly from each of the objects via the non-visible RF signals, meet one or more user input criteria.

6. The method of claim 1, wherein the AR element of each of the objects in the visual scan area is generated based on one or more attributes of each of the objects, retrieved from a source selected from each of the objects, one or more social media profiles associated with each of the objects, and combinations thereof.

7. The method of claim 6, wherein the AR element of each of the objects in the visual scan area is generated further based on a timing associated with the attributes of each of the objects.

8. The method of claim 1, wherein the AR element of each of the objects in the visual scan area is anchored to each of the objects based on one or more attributes of each of the objects.

9. The method of claim 1, wherein the AR element of each of the objects is scaled and oriented based on the relative location and an orientation of each of the objects.

10. The method of claim 1, wherein the visual scan area is determined based on a field of view of a camera of the mobile device and the non-visible RF signals.

11. A system for rendering an Augmented Reality (AR) image, comprising a mobile device including:
(1) a display;
(2) one or more sensors of radio frequency signals, excluding visible spectrum frequencies ("non-visible RF signals");
(3) an object registering module configured to repeatedly detect and register one or more objects located within a vicinity of the mobile device, by the sensors communicating with the objects by the non-visible RF signals;
(4) an object tracking module configured repeatedly track a relative location of each of the objects located within a vicinity of the mobile device; and
(5) an AR rendering module configured to:
(a) generate in real time an AR element of each of the objects with an AR type as Large-AR-Image (LARI) and located inside a visual scan area by:
A. determining a boundary of the AR element, the boundary configured to surround a real-world image of the object;
B. determining a cut-out area within the boundary, the cut-out area configured to show a predetermined portion of the real-world image of the object, and
C. rendering an AR effect within the boundary, excluding the cut-out area, the AR effect scaled and oriented based on the relative location and an orientation of the object, and
(b) display the AR image rendered with the AR element anchored to each of the objects located inside the visual scan area, and
wherein the cut-out area is determined based on:
a distance between the mobile device and each of multiple transmission broadcast units ("TBUs") locate along a peripheral of a projected cut-out area, the distance determined based on a response time for each TBU to respond to the mobile device via the non-visible RF signals and in a sequence of the TBUs; and
a distance between each pair of consecutive TBUs.

12. The system of claim 11, wherein the AR rendering module is further configured to generate and display the AR element of each of the objects only if one or more attributes of each of the objects, retrieved directly from each of the objects via the non-visible RF signals, meet one or more user input criteria.

13. A method for rendering an Augmented Reality (AR) image on a display of a mobile device with one or more objects detected by radio frequency signals, excluding visible spectrum frequencies, ("non-visible RF signals"), the method comprising the steps of:
  (1) repeatedly detecting and registering the objects located within a vicinity of the mobile device, by one or more sensors of the mobile device communicating with the objects by the non-visible RF signals;
  (2) repeatedly tracking a relative location of each of the objects located within a vicinity of the mobile device, relative to the mobile device;
  (3) generating in real time an AR element of each of the objects with an AR type as Large-AR-Image (LARI) and located inside a visual scan area by:
    (a) determining a boundary of the AR element, the boundary configured to surround a real-world image of the object;
    (b) determining a cut-out area within the boundary, the cut-out area configured to show a predetermined portion of the real-world image of the object, and
    (c) rendering an AR effect within the boundary, excluding the cut-out area, the AR effect scaled and oriented based on the relative location and an orientation of the object; and
  (4) displaying the AR image rendered with the AR element anchored to each of the objects located inside the visual scan area; and
  wherein the cut-out area is determined based on:
    a predetermined shape of the cut-out area;
    predetermined locations of multiple transmission broadcast units ("TBUs") relative to a projected cut-out area;
    a distance between the mobile device and each TBU determined based on a response time for each TBU to respond to the mobile device via the non-visible RF signals; and
    a distance between each pair of the TBUs.

14. The method of claim 13, wherein the step of detecting and registering the one or more objects further comprises the steps of:
  (1) simultaneously scanning and registering a batch of the one or more objects located within the vicinity of the mobile device, by the one or more sensors:
    (a) broadcasting a single request of a unique identification (ID) by the non-visible RF signals,
    (b) receiving an ID of each of the one or more objects by the non-visible RF signals, and
    (c) if the ID of an object is not registered in a storage component of the mobile device, including the object as a member object of the batch until reaching a predetermined size of the batch; and
  (2) register each member object of the batch by saving the ID and the relative location of the member object to the storage component.

15. The method of claim 14, wherein if a reference object selected from the objects, other than a member object in the batch, exists, the object detecting module is further configured to repeatedly determine the relative location of the member object by performing triangulation with a reference to the reference object based on:
  (1) a distance between the mobile device and the member object determined in real time based on a response time for the member object to respond to the mobile device via the non-visible RF signals;
  (2) a distance between the mobile device and the reference object determined in real time based on a response time for the reference object to respond to the mobile device via the non-visible RF signals; and
  (3) a distance between the reference object and the member object, provided by the reference object, determined in real time based on a response time for the member object to respond to the reference object via the non-visible RF signals.

16. The method of claim 13, wherein the tracking module is further configured to remove a registered object from the storage component if the relative location of the registered object has been outside the visual scan area for at least a predetermined period of time.

17. The method of claim 13, wherein the AR element of each of the objects is generated and displayed only if one or more attributes of each of the objects, retrieved directly from each of the objects via the non-visible RF signals, meet one or more user input criteria.

18. The method of claim 13, wherein the AR element of each of the objects in the visual scan area is generated based on one or more attributes of each of the objects, retrieved from a source selected from each of the objects, one or more social media profiles associated with each of the objects, and combinations thereof.

19. The method of claim 6, wherein the AR element of each of the objects in the visual scan area is generated further based on a timing associated with the attributes of each of the objects.

20. The method of claim 13, wherein the AR element of each of the objects in the visual scan area is anchored to each of the objects based on one or more attributes of each of the objects.

21. The method of claim 13, wherein the AR element of each of the objects is scaled and oriented based on the relative location and an orientation of each of the objects.

22. The method of claim 13, wherein the visual scan area is determined based on a field of view of a camera of the mobile device and the non-visible RF signals.

23. A method for rendering an Augmented Reality (AR) image on a display of a mobile device with one or more objects detected by radio frequency signals, excluding visible spectrum frequencies, ("non-visible RF signals"), the method comprising the steps of:
  (1) repeatedly detecting and registering the objects located within a vicinity of the mobile device, by one or more sensors of the mobile device communicating with the objects by the non-visible RF signals;
  (2) repeatedly tracking a relative location of each of the objects located within a vicinity of the mobile device, relative to the mobile device;
  (3) generating in real time an AR element of each of the objects with an AR type as Large-AR-Image (LARI) and located inside a visual scan area by:
    (a) determining a boundary of the AR element, the boundary configured to surround a real-world image of the object;
    (b) determining a cut-out area within the boundary, the cut-out area configured to show a predetermined portion of the real-world image of the object, and
    (c) rendering an AR effect within the boundary, excluding the cut-out area, the AR effect scaled and oriented based on the relative location and an orientation of the object; and (4) displaying the AR image rendered with the AR element anchored to each of the objects located inside the visual scan area; and wherein the boundary is determined based on:
- a predetermined shape of the boundary;
- predetermined locations of multiple transmission broadcast units ("TBUs") relative to a projected boundary;
- a distance between the mobile device and each TBUs determined in real time based on a response time for each TBU to respond to the mobile device via the non-visible RF signals; and
- a distance between each pair of the TBUs.

24. The method of claim 23, wherein the step of detecting and registering the one or more objects further comprises the steps of:

(1) simultaneously scanning and registering a batch of the one or more objects located within the vicinity of the mobile device, by the one or more sensors:
  (a) broadcasting a single request of a unique identification (ID) by the non-visible RF signals,
  (b) receiving an ID of each of the one or more objects by the non-visible RF signals, and
  (c) if the ID of an object is not registered in a storage component of the mobile device, including the object as a member object of the batch until reaching a predetermined size of the batch; and (2) register each member object of the batch by saving the ID and the relative location of the member object to the storage component.

25. The method of claim 24, wherein if a reference object selected from the objects, other than a member object in the batch, exists, the object detecting module is further configured to repeatedly determine the relative location of the member object by performing triangulation with a reference to the reference object based on:

(1) a distance between the mobile device and the member object determined in real time based on a response time for the member object to respond to the mobile device via the non-visible RF signals;

(2) a distance between the mobile device and the reference object determined in real time based on a response time for the reference object to respond to the mobile device via the non-visible RF signals; and (3) a distance between the reference object and the member object, provided by the reference object, determined in real time based on a response time for the member object to respond to the reference object via the non-visible RF signals.

26. The method of claim 23, wherein the tracking module is further configured to remove a registered object from the storage component if the relative location of the registered object has been outside the visual scan area for at least a predetermined period of time.

27. The method of claim 23, wherein the AR element of each of the objects is generated and displayed only if one or more attributes of each of the objects, retrieved directly from each of the objects via the non-visible RF signals, meet one or more user input criteria.

28. The method of claim 23, wherein the AR element of each of the objects in the visual scan area is generated based on one or more attributes of each of the objects, retrieved from a source selected from the objects, one or more social media profiles associated with each of the objects, and combinations thereof.

29. The method of claim 28, wherein the AR element of each of the objects in the visual scan area is generated further based on a timing associated with the attributes of each of the objects.

30. The method of claim 23, wherein the AR element of each of the objects in the visual scan area is anchored to each of the objects based on one or more attributes of each of the objects.

31. The method of claim 23, wherein the AR element of each of the objects is scaled and oriented based on the relative location and an orientation of each of the objects.

32. The method of claim 23, wherein the visual scan area is determined based on a field of view of a camera of the mobile device and the non-visible RF signals.

33. A method for rendering an Augmented Reality (AR) image on a display of a mobile device with one or more objects detected by radio frequency signals, excluding visible spectrum frequencies, ("non-visible RF signals"), the method comprising the steps of:

(1) repeatedly detecting and registering the objects located within a vicinity of the mobile device, by one or more sensors of the mobile device communicating with the objects by the non-visible RF signals;

(2) repeatedly tracking a relative location of each of the objects located within a vicinity of the mobile device, relative to the mobile device;

(3) generating in real time an AR element of each of the objects with an AR type as Large-AR-Image (LARI) and located inside a visual scan area by:
  (a) determining a boundary of the AR element, the boundary configured to surround a real-world image of the object;
  (b) determining a cut-out area within the boundary, the cut-out area configured to show a predetermined portion of the real-world image of the object, and
  (c) rendering an AR effect within the boundary, excluding the cut-out area, the AR effect scaled and oriented based on the relative location and an orientation of the object; and (4) displaying the AR image rendered with the AR element anchored to each of the objects located inside the visual scan area; and wherein the boundary is determined based on:
- a predetermined shape of the boundary;
- locations of multiple transmission broadcast units ("TBUs") relative to a projected boundary;
- a distance between the mobile device and each TBUs determined in real time based on a response time for each TBU to respond to the mobile device via the non-visible RF signals; and
- a distance between each pair of the TBUs.

34. The method of claim 33, wherein the step of detecting and registering the one or more objects further comprises the steps of:

(1) simultaneously scanning and registering a batch of the one or more objects located within the vicinity of the mobile device, by the one or more sensors:
  (a) broadcasting a single request of a unique identification (ID) by the non-visible RF signals,
  (b) receiving an ID of each of the one or more objects by the non-visible RF signals, and
  (c) if the ID of an object is not registered in a storage component of the mobile device, including the object as a member object of the batch until reaching a predetermined size of the batch; and (2) register each member object of the batch by saving the ID and the relative location of the member object to the storage component.

35. The method of claim 34, wherein if a reference object selected from the objects, other than a member object in the batch, exists, the object detecting module is further configured to repeatedly determine the relative location of the member object by performing triangulation with a reference to the reference object based on:
(1) a distance between the mobile device and the member object determined in real time based on a response time for the member object to respond to the mobile device via the non-visible RF signals;
(2) a distance between the mobile device and the reference object determined in real time based on a response time for the reference object to respond to the mobile device via the non-visible RF signals; and
(3) a distance between the reference object and the member object, provided by the reference object, determined in real time based on a response time for the member object to respond to the reference object via the non-visible RF signals.

36. The method of claim 33, wherein the tracking module is further configured to remove a registered object from the storage component if the relative location of the registered object has been outside the visual scan area for at least a predetermined period of time.

37. The method of claim 33, wherein the AR element of each of the objects is generated and displayed only if one or more attributes of each of the objects, retrieved directly from each of the objects via the non-visible RF signals, meet one or more user input criteria.

38. The method of claim 33, wherein the AR element of each of the objects in the visual scan area is generated based on one or more attributes of each of the objects, retrieved from a source selected from each of the objects, one or more social media profiles associated with each of the objects, and combinations thereof.

39. The method of claim 38, wherein the AR element of each of the objects in the visual scan area is generated further based on a timing associated with the attributes of each of the objects.

40. The method of claim 33, wherein the AR element of each of the objects in the visual scan area is anchored to each of the objects based on one or more attributes of each of the objects.

41. The method of claim 33, wherein the AR element of each of the objects is scaled and oriented based on the relative location and an orientation of each of the objects.

42. The method of claim 33, wherein the visual scan area is determined based on a field of view of a camera of the mobile device and the non-visible RF signals.

43. A system for rendering an Augmented Reality (AR) image, comprising a mobile device including:
(1) a display;
(2) one or more sensors of radio frequency signals, excluding visible spectrum frequencies ("non-visible RF signals");
(3) an object registering module configured to repeatedly detect and register one or more objects located within a vicinity of the mobile device, by the sensors communicating with the objects by the non-visible RF signals;
(4) an object tracking module configured repeatedly track a relative location of each of the objects located within a vicinity of the mobile device; and
(5) an AR rendering module configured to:
(a) generate in real time an AR element of each of the objects with an AR type as Large-AR-Image (LARI) and located inside a visual scan area by:
A. determining a boundary of the AR element, the boundary configured to surround a real-world image of the object;
B. determining a cut-out area within the boundary, the cut-out area configured to show a predetermined portion of the real-world image of the object, and
C. rendering an AR effect within the boundary, excluding the cut-out area, the AR effect scaled and oriented based on the relative location and an orientation of the object, and
(b) display the AR image rendered with the AR element anchored to each of the objects located inside the visual scan area, and
wherein the cut-out area is determined based on:
a predetermined shape of the cut-out area;
predetermined locations of multiple transmission broadcast units ("TBUs") relative to a projected cut-out area;
a distance between the mobile device and each TBU determined based on a response time for each TBU to respond to the mobile device via the non-visible RF signals; and
a distance between each pair of the TBUs.

44. The system of claim 43, wherein the AR rendering module is further configured to generate and display the AR element of each of the objects only if one or more attributes of each of the objects, retrieved directly from each of the objects via the non-visible RF signals, meet one or more user input criteria.

45. A system for rendering an Augmented Reality (AR) image, comprising a mobile device including:
(1) a display;
(2) one or more sensors of radio frequency signals, excluding visible spectrum frequencies ("non-visible RF signals");
(3) an object registering module configured to repeatedly detect and register one or more objects located within a vicinity of the mobile device, by the sensors communicating with the objects by the non-visible RF signals;
(4) an object tracking module configured repeatedly track a relative location of each of the objects located within a vicinity of the mobile device; and
(5) an AR rendering module configured to:
(a) generate in real time an AR element of each of the objects with an AR type as Large-AR-Image (LARI) and located inside a visual scan area by:
A. determining a boundary of the AR element, the boundary configured to surround a real-world image of the object;
B. determining a cut-out area within the boundary, the cut-out area configured to show a predetermined portion of the real-world image of the object, and
C. rendering an AR effect within the boundary, excluding the cut-out area, the AR effect scaled and oriented based on the relative location and an orientation of the object, and
(b) display the AR image rendered with the AR element anchored to each of the objects located inside the visual scan area, and wherein the boundary is determined based on:
(6) a predetermined shape of the boundary;
   predetermined locations of multiple transmission broadcast units ("TBUs") relative to a projected boundary;
   a distance between the mobile device and each TBUs determined in real time based on a response time for each TBU to respond to the mobile device via the non-visible RF signals; and
   a distance between each pair of the TBUs.

46. The system of claim 45, wherein the AR rendering module is further configured to generate and display the AR element of each of the objects only if one or more attributes of each of the objects, retrieved directly from each of the objects via the non-visible RF signals, meet one or more user input criteria.

47. A system for rendering an Augmented Reality (AR) image, comprising a mobile device including:
(1) a display;
(2) one or more sensors of radio frequency signals, excluding visible spectrum frequencies ("non-visible RF signals");
(3) an object registering module configured to repeatedly detect and register one or more objects located within a vicinity of the mobile device, by the sensors communicating with the objects by the non-visible RF signals;
(4) an object tracking module configured repeatedly track a relative location of each of the objects located within a vicinity of the mobile device; and
(5) an AR rendering module configured to:
   (a) generate in real time an AR element of each of the objects with an AR type as Large-AR-Image (LARI) and located inside a visual scan area by:
      A. determining a boundary of the AR element, the boundary configured to surround a real-world image of the object;
      B. determining a cut-out area within the boundary, the cut-out area configured to show a predetermined portion of the real-world image of the object, and
      C. rendering an AR effect within the boundary, excluding the cut-out area, the AR effect scaled and oriented based on the relative location and an orientation of the object, and
   (b) display the AR image rendered with the AR element anchored to each of the objects located inside the visual scan area, and
wherein the boundary is determined based on:
   a predetermined shape of the boundary;
   locations of multiple transmission broadcast units ("TBUs") relative to a projected boundary;
   a distance between the mobile device and each TBUs determined in real time based on a response time for each TBU to respond to the mobile device via the non-visible RF signals; and
   a distance between each pair of the TBUs.

48. The system of claim 47, wherein the AR rendering module is further configured to generate and display the AR element of each of the objects only if one or more attributes of each of the objects, retrieved directly from each of the objects via the non-visible RF signals, meet one or more user input criteria.

* * * * *